(12) United States Patent
Jenkinson

(10) Patent No.: US 11,671,684 B2
(45) Date of Patent: Jun. 6, 2023

(54) MULTIFUNCTIONAL DEVICE FOR USE IN AUGMENTED/VIRTUAL/MIXED REALITY, LAW ENFORCEMENT, MEDICAL, MILITARY, SELF DEFENSE, INDUSTRIAL, AND OTHER APPLICATIONS

(71) Applicant: Glenn Michael Jenkinson, Houston, TX (US)

(72) Inventor: Glenn Michael Jenkinson, Houston, TX (US)

(\*) Notice: Subject to any disclaimer, the term of this patent is extended or adjusted under 35 U.S.C. 154(b) by 0 days.

(21) Appl. No.: 16/870,993

(22) Filed: May 10, 2020

(65) Prior Publication Data
US 2020/0358931 A1 Nov. 12, 2020

Related U.S. Application Data

(60) Provisional application No. 62/846,296, filed on May 10, 2019.

(51) Int. Cl.
*H04N 23/51* (2023.01)
*H04N 23/54* (2023.01)
(Continued)

(52) U.S. Cl.
CPC ............. *H04N 23/51* (2023.01); *H04N 23/54* (2023.01); *H04N 23/695* (2023.01); *H04N 23/555* (2023.01)

(58) Field of Classification Search
CPC ............... H04N 5/2252; H04N 5/2253; H04N 5/23299; H04N 2005/2255;
(Continued)

(56) References Cited

U.S. PATENT DOCUMENTS

| 1,780,585 A | 11/1939 | Armin |
| 2,767,989 A | 10/1956 | Luebbers |

(Continued)

FOREIGN PATENT DOCUMENTS

| CN | 201540394 U | * | 8/2010 |
| KR | 100758612 B1 | * | 9/2007 |

(Continued)

OTHER PUBLICATIONS

Han Ooi, The Odyssey Armament Training System an Adaptable System for Operators, Aug. 1, 2017.
(Continued)

*Primary Examiner* — Michael Lee
(74) *Attorney, Agent, or Firm* — Vincent J. Allen; James H. Ortega; Carstens, Allen & Gourley, LLP

(57) ABSTRACT

A variable configuration sensing, emitting, processing, and analysis system for various uses including but not limited to Virtual/Augmented/Mixed/Actual Reality imaging and tracking; Machine Vision; Object Identification and Characterization; First Responder Tracking, Diagnostics, and Triage; Environmental/Condition Monitoring and Assessment; Guidance, Navigation & Control; Communications; Logistics; and Recording. The variable configuration sensor, emitter, processor, and analysis system contains a housing and a mounting component adaptable to a variety of applications. The housing may include one or more sensors and/or emitters, vision processing units, micro-processing units, connectors, and power supplies. The sensors may include but are not limited to electromagnetic and/or ionizing radiation, distance, motion, acceleration, pressure, position, humidity, temperature, wind, sound, toxins, and magnetic. The emitters may include but are not limited to electromagnetic and/or ionizing radiation, sound, and fluids.
(Continued)

The device may be ruggedized for use in extreme environments.

14 Claims, 48 Drawing Sheets

(51) Int. Cl.
  *H04N 23/695* (2023.01)
  *H04N 23/50* (2023.01)

(58) Field of Classification Search
  CPC ...... G03B 2215/0567; G03B 2217/002; G03B 17/08; G01S 3/00
  USPC .......................................................... 348/373
  See application file for complete search history.

(56) References Cited

U.S. PATENT DOCUMENTS

| | | | |
|---|---|---|---|
| 3,860,939 A | | 1/1975 | Wolfe |
| 4,113,137 A * | | 9/1978 | Wind ..................... G02B 7/007 |
| | | | 220/319 |
| 4,295,721 A * | | 10/1981 | Rebikoff ............. H04N 5/2254 |
| | | | 396/26 |
| 4,994,829 A * | | 2/1991 | Tsukamoto ............ G03B 17/08 |
| | | | 359/507 |
| 6,332,432 B1 * | | 12/2001 | Marshall ................ A01K 61/90 |
| | | | 119/859 |
| 7,357,886 B2 | | 4/2008 | Groth |
| 8,254,776 B2 | | 8/2012 | Schnell |
| 10,041,764 B2 | | 8/2018 | Ooi |
| 10,098,267 B1 * | | 10/2018 | Janson ................. H04N 5/2252 |
| 10,275,688 B2 | | 4/2019 | Jiang |
| 2006/0289772 A1 | | 12/2006 | Johnson et al. |
| 2012/0157158 A1 | | 6/2012 | Mayor et al. |
| 2013/0314503 A1 | | 11/2013 | Nix et al. |
| 2015/0113851 A1 | | 4/2015 | Bensayan |
| 2015/0205186 A1 * | | 7/2015 | Park ....................... G03B 17/08 |
| | | | 348/373 |
| 2016/0080651 A1 | | 3/2016 | Yokomitsu et al. |
| 2016/0281567 A1 | | 10/2016 | Tsui et al. |
| 2016/0295096 A1 * | | 10/2016 | Lever ......................... H01Q 1/22 |
| 2017/0223245 A1 * | | 8/2017 | Park ....................... H04N 5/2254 |
| 2017/0285335 A1 * | | 10/2017 | Moncino ............ G02B 27/0006 |
| 2018/0314134 A1 * | | 11/2018 | Fukai ........................ G02B 7/10 |
| 2019/0137723 A1 * | | 5/2019 | Bernal .................... G02B 7/008 |
| 2020/0162702 A1 * | | 5/2020 | Olsson ............... H04N 5/23238 |
| 2020/0201144 A1 | | 6/2020 | Ramones et al. |

FOREIGN PATENT DOCUMENTS

| | | |
|---|---|---|
| WO | WO2013111933 | 8/2013 |
| WO | WO2018055232 | 3/2018 |

OTHER PUBLICATIONS

Han Ooi, Odyssey ATS Website, http://www.odysseyarm.com/ Dec. 5, 2018.
Wasserman Blink, "Outdoor & Indoor Cam Adjustable Metal Wall Bracket", Camera & Photo Jun. 7, 2018.
"How to Attach a Camera to a Tripod", WikiHow, Oct. 8, 2020.

* cited by examiner

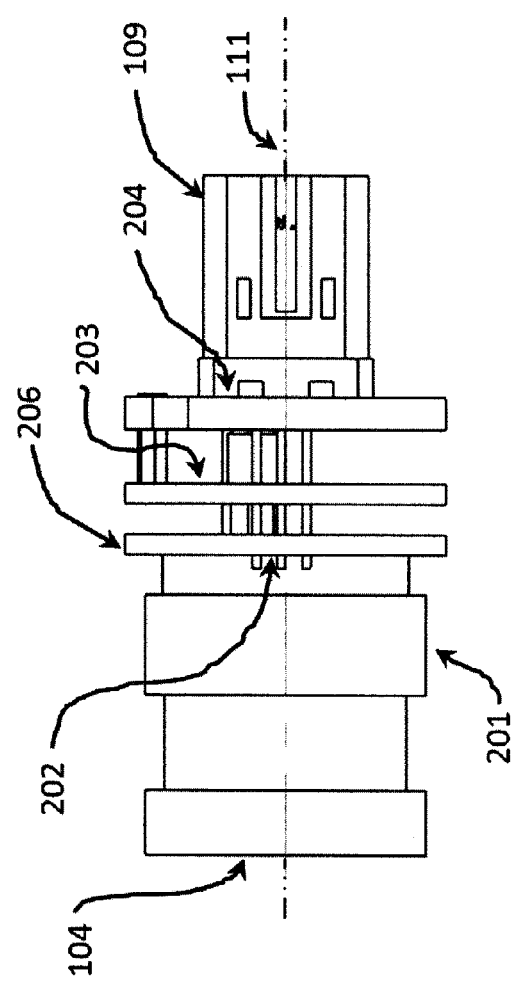

SECTION -A-A

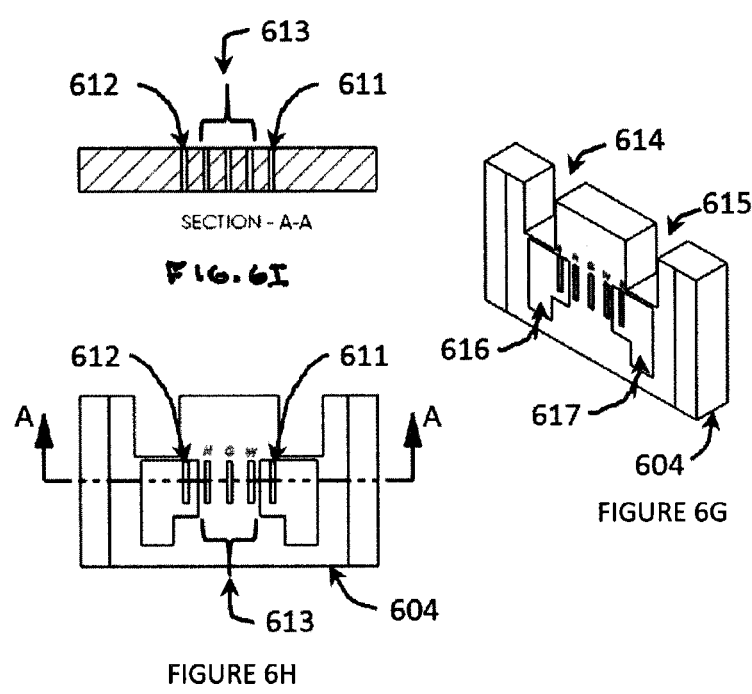

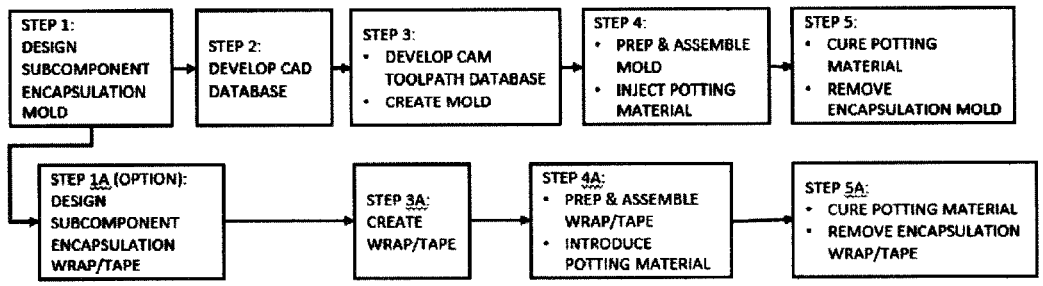
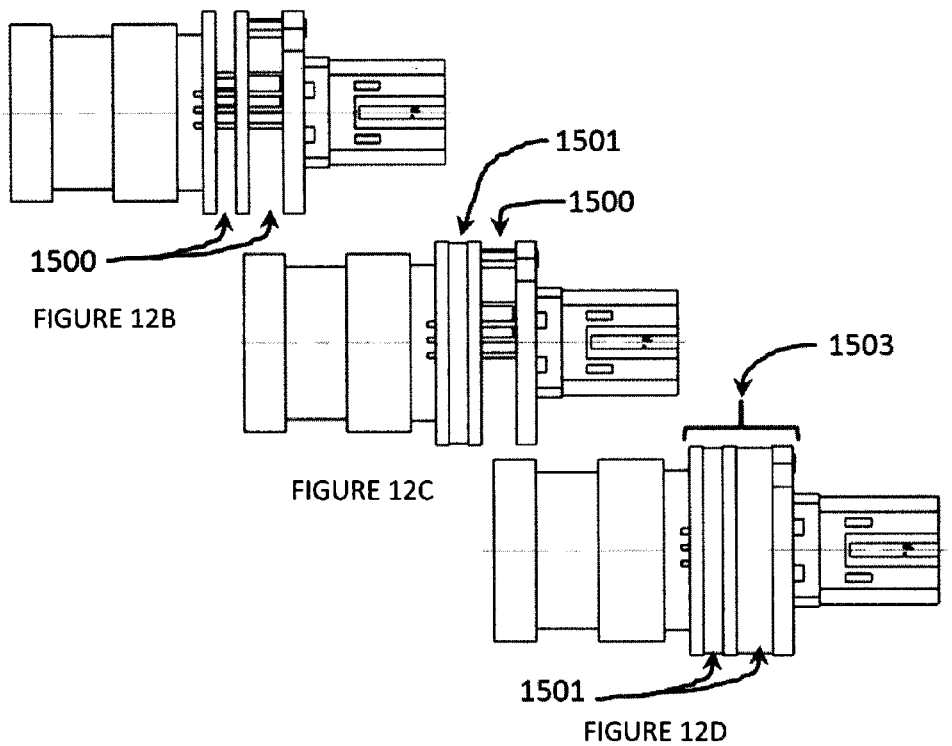
FIGURE 12A
FIGURE 12B
FIGURE 12C
FIGURE 12D

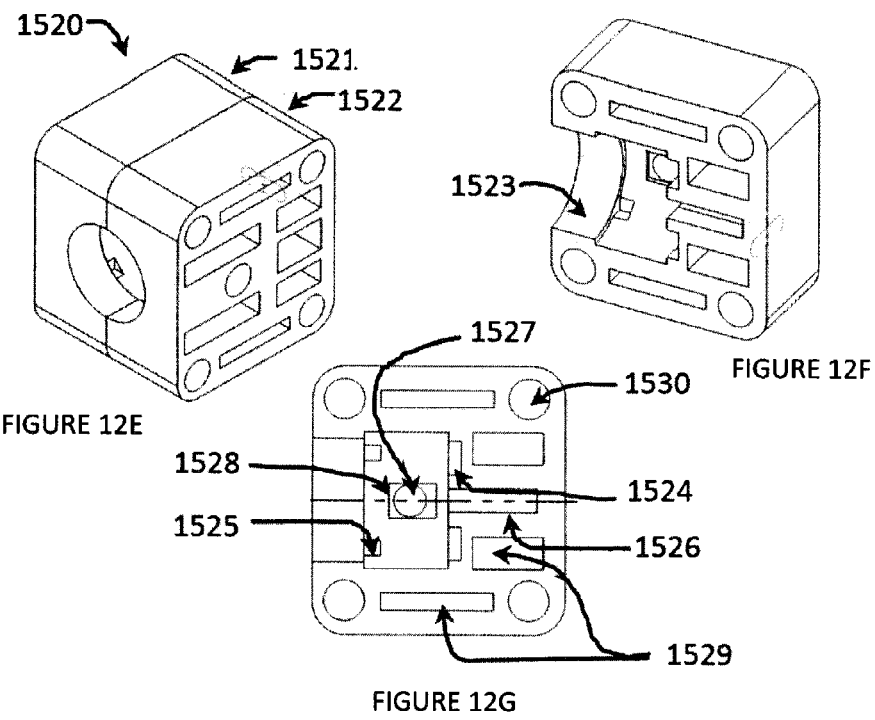

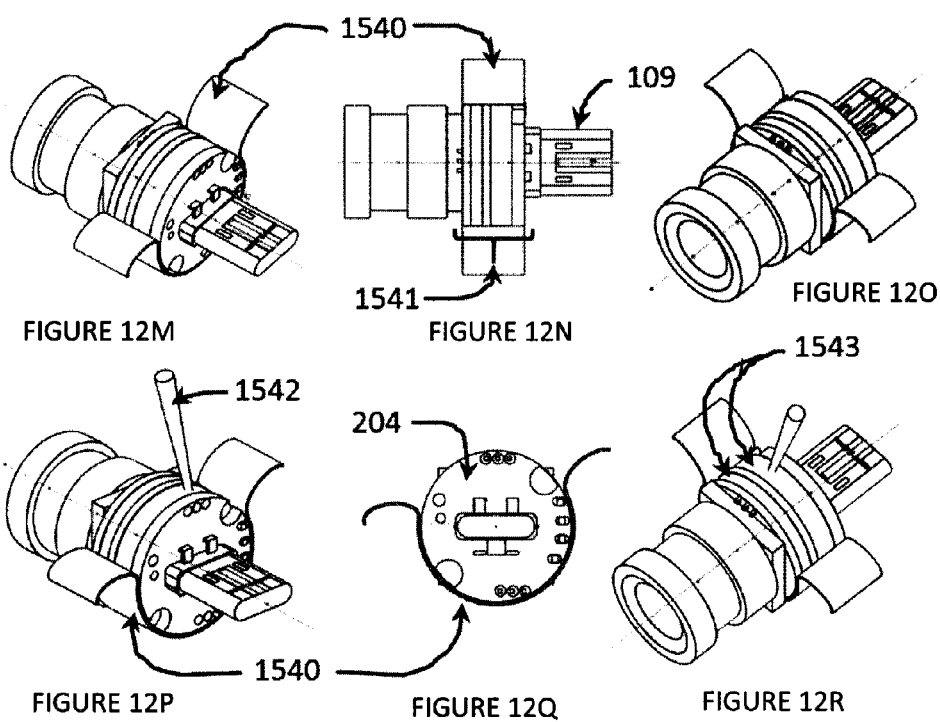

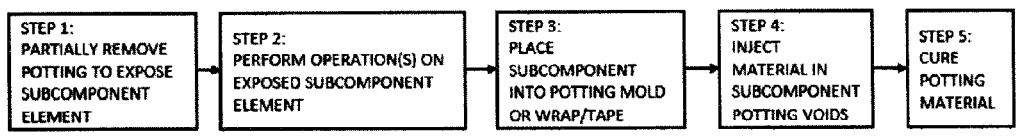
FIGURE 13A
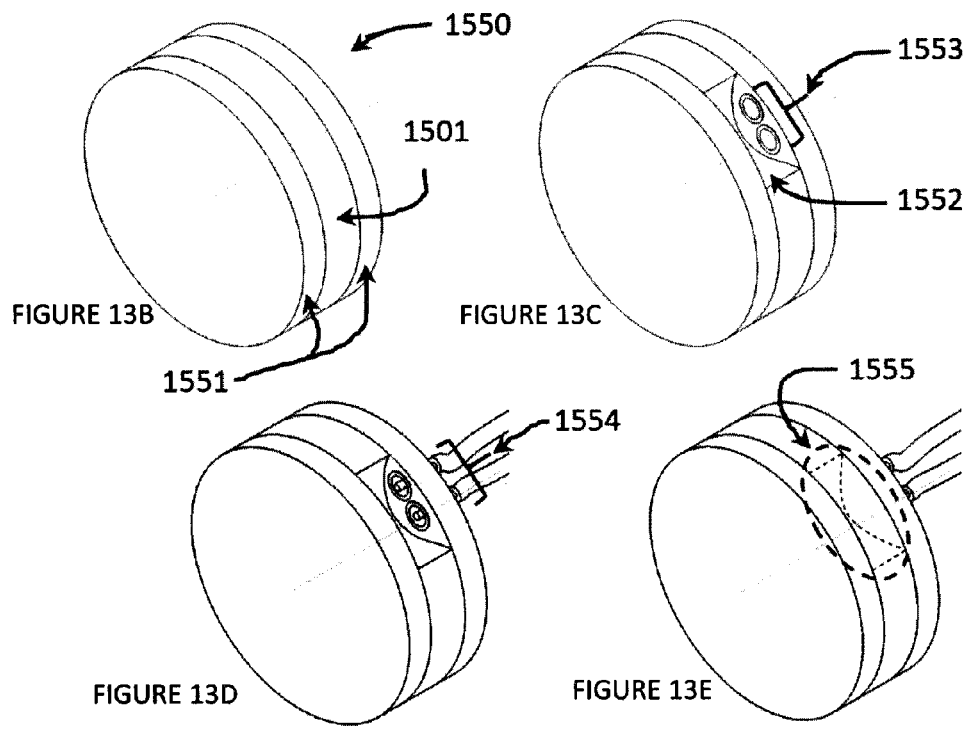

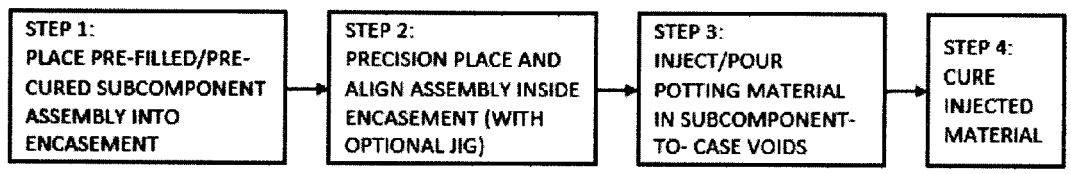
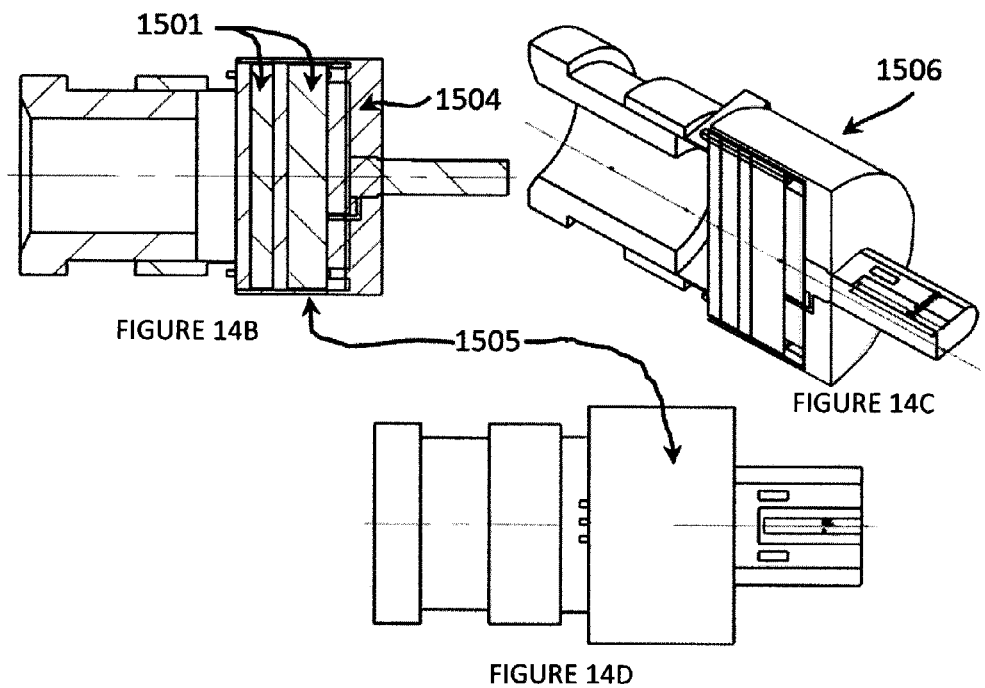

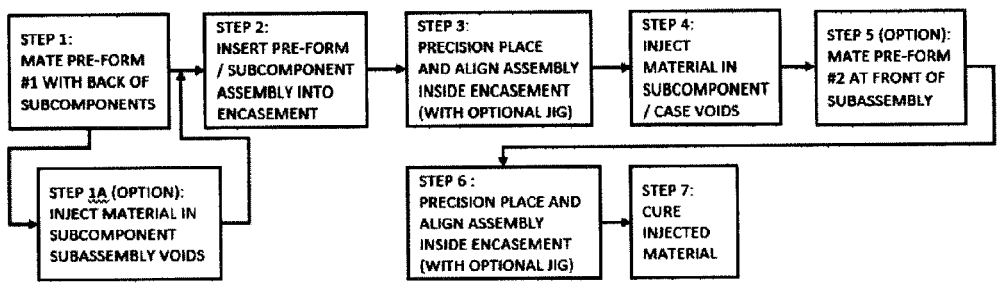
FIGURE 15A
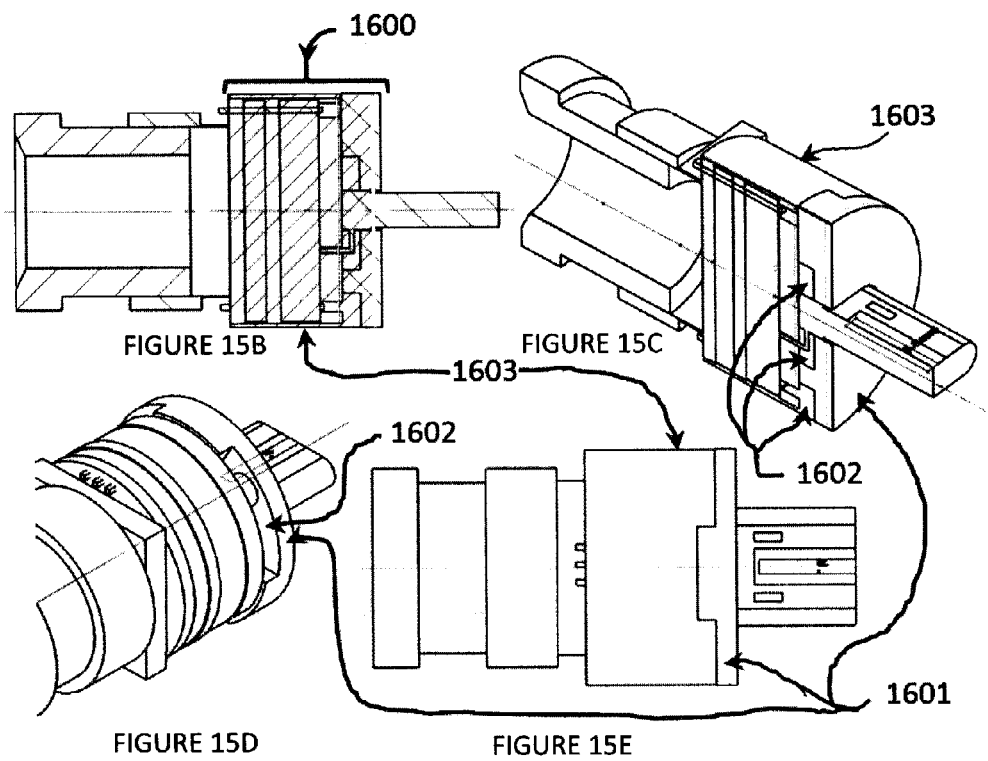
FIGURE 15B  FIGURE 15C
FIGURE 15D  FIGURE 15E

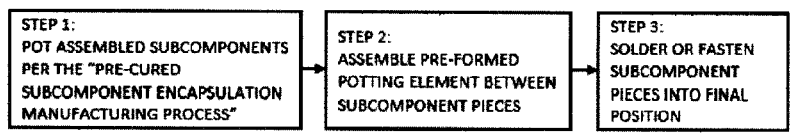
FIGURE 16A
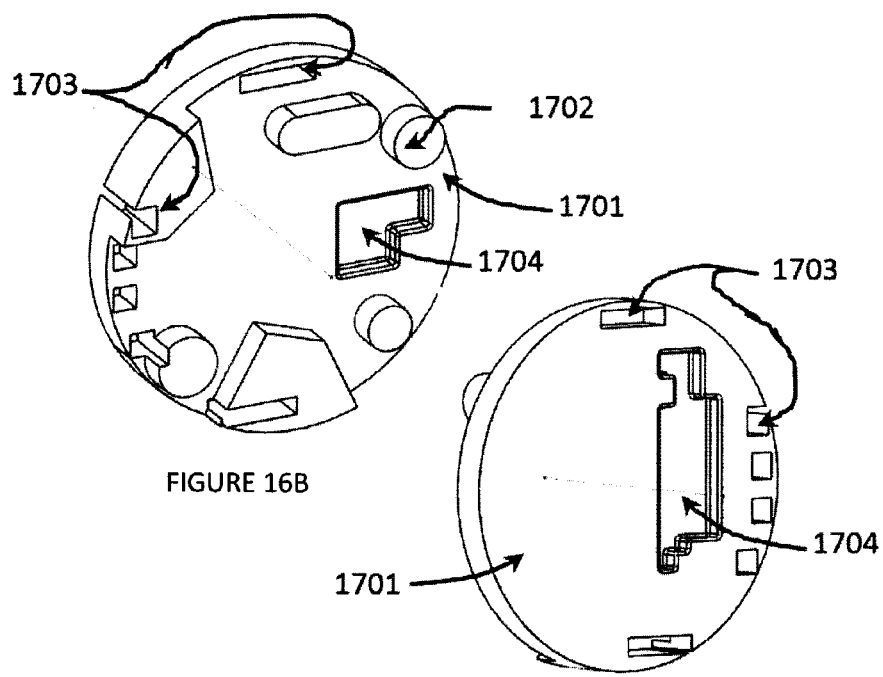
FIGURE 16B
FIGURE 16C

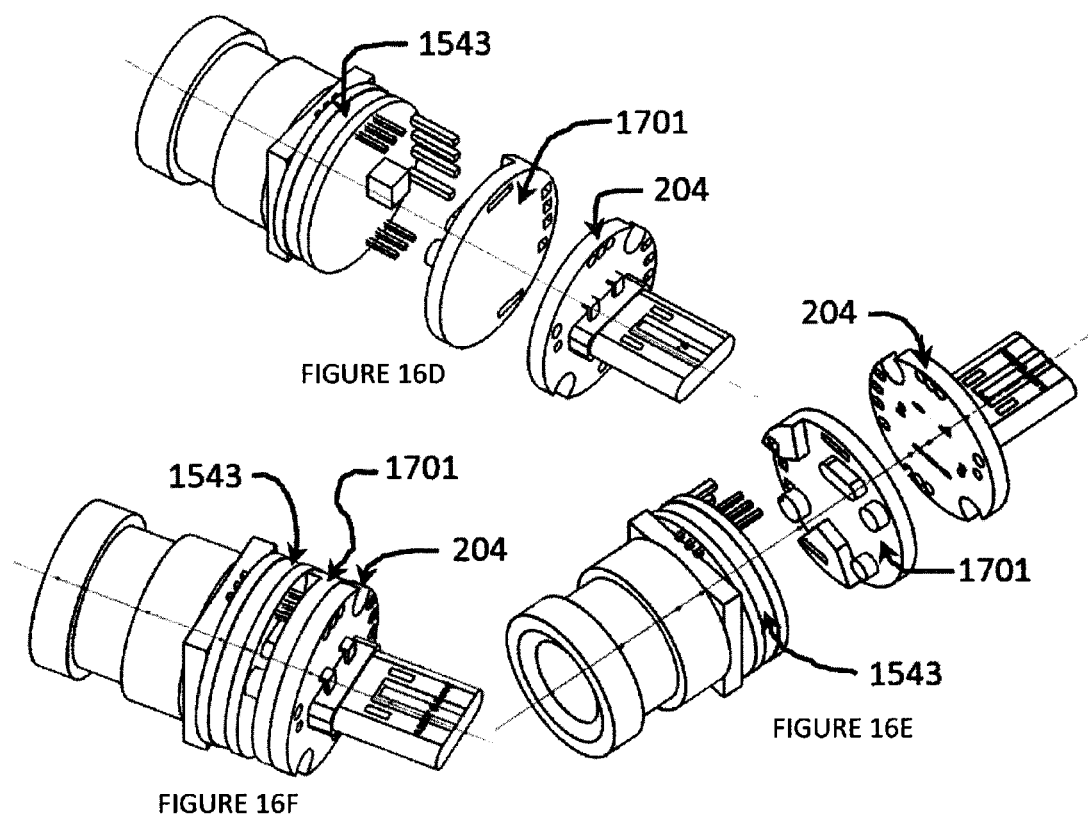

MULTIFUNCTIONAL DEVICE FOR USE IN AUGMENTED/VIRTUAL/MIXED REALITY, LAW ENFORCEMENT, MEDICAL, MILITARY, SELF DEFENSE, INDUSTRIAL, AND OTHER APPLICATIONS

RELATED APPLICATION

This disclosure claims priority to the provisional application entitled "Multifunctional Device For Use In Augmented/Virtual/Mixed Reality, Law Enforcement, Medical, Military, Self Defense, Industrial, And Other Applications", Ser. No. 62/846,296 filed May 10, 2019. This provisional application is incorporated by reference herein in its entirety.

FIELD OF USE

This disclosure pertains to a platform or device that includes a combination of subcomponents that, when separately or variously combined, are useful in augmented/virtual/mixed reality, law enforcement, medical, military, self defense, Industrial, and other applications. The device may include an image capturing component containing a lens and other sub-components that may receive electromagnetic radiation including but not limited to ultra-violet, visible light and infra-red radiation. The radiation is received through the lens onto electrical sensors. The electrical sensors may detect an image from the received radiation. The electrical sensors may convert the detected image into an electrical signal. The device may include emitters that transmit electromagnetic radiation (EMR) in a wide range of visible and invisible wavelengths. The device may include sound emitters. The device may contain distance, motion, position, pressure, and humidity sensors. The device may also contain image processing units (IPU), vision processing units (VPU), neural networks, databases, microprocessors, central processing units (CPU), software, firmware, power and/or data connectors, and power sources. The device may include various navigation components and systems such as inertial maneuvering unit (IMU), optical (ONS), inertial (INS) and magnetic (MNS) navigation, or attitude heading and reference systems (AHRS).

BACKGROUND

Cameras, accelerometers and other components may be utilized in creating virtual and or augmented reality representations. Emitters using sound and EMR are known. Such devices may be utilized in creating virtual and or augmented reality images, sounds, movement, and environmental representations. Such devices and or combination of devices may be used in a wide variety of applications including but not limited to: a) image recognition and characterization; b) identity recognition and characterization; c) emergency response, damage assessment, and triage; d) personnel/object identification, monitoring, locating, tracking, communication, and coordinating; e) hazard detecting, alarming, and response; f) guidance, navigation, and control; g) artificial intelligence and machine learning. According to the prior art, a number of devices are used for detecting, monitoring, tracking, and evaluating objects, personnel, and environment for imaging, surveillance, identification, position, orientation, motion, vibration, elevation, acoustics, explosions, radiation, magnetics, toxins, contaminates, etcetera. However, these devices do not have the ability to combine a variety of these capabilities into a single compact, sealed, explosion- and heat-tolerant device. Nor do they have the on-board ability to process images and data using vision processing units, neural networks, artificial intelligence, and machine learning hardware and software to produce condensed intelligence-rich outputs/capabilities. Therefore, multiple separate devices are needed to provide the variety of capabilities of the disclosed device. This increases: device count; system complexity; size and weight; device interoperability risks; data loss risks; data transfer latency, analyses delays; decision formulation delays; response formulation delays; and response action delays.

SUMMARY OF DISCLOSURE

By using various combinations of integrated sensors and capabilities, the disclosed device provides the ability to detect and synthesize varied complex data, perform high level image and data processing using state of the art Vision Processing Units and Neural Network components. The combination of this wide variety and variability of sensors, processors, and analyzers allows the device to collect, process, and refine sensor data; perform artificial intelligence and machine learning operations; and produce condensed high quality data and intelligence products on-board the device. In view of the above, a need exists for an improved variable configuration integrated device and methods for on-board sensing, processing, and analyzing data that will provide the ability to sense, monitor, track, and evaluate objects, personnel, and environment for imaging, surveillance, identification, position, orientation, motion, vibration, elevation, acoustics, explosions, radiation, magnetics, toxins, contaminates, etcetera. This application discloses a multifunctional device that may be utilized with image sensors, accelerometers, magnetometers, gravitometers, inclinometers, gyroscopes, GPS, or other components to track or monitor the position or orientation of a tool or other apparatus. The application also discloses use of the device to track the position or orientation of such a tool or apparatus. This application also discloses an electrical signal or power component that may be utilized with the device.

In a further embodiment, the image capturing device may include a CPU or microprocessor to provide analysis of the captured image.

In a further embodiment, the image capturing device may include a VPU (Vision Processing Unit) or vision microprocessor to provide preprocessing and/or object identification and characterization and other analysis of the captured image.

This disclosure also illustrates use of the imaging capturing device and CPU or microprocessor with other components, e.g., accelerometers, etc., for tracking or controlling the positioning of an apparatus or tool.

This disclosure also illustrates use of the device components within a housing. In one embodiment, the housing may be attached to a separate apparatus and a connector on the device allows electrical communication between the device and the separate apparatus. It will be appreciated that this separate apparatus may include accelerometers, etc.

This disclosure also illustrates use of the device to detect, analyze, and evaluate human position, condition and activity; and the effects on humans of environmental factors such as falls, shootings, impacts, explosions, toxic fluids, electromagnetic and ionizing radiation, acoustics, pressure, vacuum, etc.

This disclosure also illustrates use of the device to detect, analyze, and evaluate equipment status, condition, and operation.

This disclosure also illustrates use of the device to identify persons and access personal and personnel information for use in handling, evaluating, analyzing, and treating persons by first responders, follow on responders, and care givers in military and civilian applications.

This disclosure also illustrates use of the device to identify objects and access object information for use in handling, evaluating, analyzing, and treating objects by first responders, follow on responders, and remediators in military and civilian applications.

This disclosure also illustrates use of the device to monitor use and manage replenishment of consumables to and from local and remote locations.

This disclosure also illustrates use of the device to coordinate communication and navigation among two or more independent objects such as personnel, equipment, munitions, and/or transporters.

SUMMARY OF DRAWINGS

The accompanying drawings, which are incorporated in and constitute a part of the disclosure, illustrate preferred embodiments. These drawings, together with the general description of the disclosure given above and the detailed description of the preferred embodiments given below, serve to explain the principles of the disclosure.

FIG. 2 illustrates a side view of the image capturing device including the lens 104, lens mount 201, EMR image sensor 202 at the first end, and related components 203 for transforming radiation received through the lens into electrical signals. Also shown is an adaptive PCB 204 upon which is attached an electronic connector 109.

FIGS. 5L-V illustrate a module-to-module AJD (Alternate Joint Design).

FIG. 5U Illustrates a radial cross section view of the AJD with the connecting collar 540 in the assemble/open position (Figure upper half) and the engaged/closed position (Figure lower half).

FIG. 12A Illustrates Pre-Cured Subcomponent Encapsulation Manufacturing Process

FIGS. 12B-D Illustrate a Pre-Cured Encapsulation of Subcomponents

FIGS. 12E-G Illustrate a Rigid Two Piece Subcomponent Encapsulation and Curing Mold.

FIGS. 12M-R Illustrate a Flexible One Piece Subcomponent Encapsulation and Curing Wrap/Film.

FIG. 13A Illustrates a Potted Subcomponent Access and Potting Repair Process.

FIGS. 13B-E Illustrate a Potted Subcomponent Accessed and Potting Repaired.

FIG. 14A Illustrates an Encapsulated Subcomponent Installation and Global Encasement Process.

FIGS. 14B-D Illustrate an Encapsulated Subcomponent after Global Encasement.

FIG. 15A Illustrates a Combined Pre-Form and In-Situ Encasement Molding Process.

FIGS. 15B-E Illustrate a Combined Pre-Form and In-Situ Encased Subcomponent.

FIG. 16A Illustrates a Combined Pre-Cured and Pre-formed Subcomponent Potting Process.

FIGS. 16B & C Illustrate a Complex Multi-Cored Pre-Formed Subcomponent Potting Part.

FIGS. 16D-F Illustrate assembly and fastening together of Pre-Potted and Cured 1543 Subcomponents with Complex Multi-Cored Pre-Formed Subcomponent Potting Part 1701.

DETAILED DESCRIPTION OF THE DISCLOSURE

A sensor system presently disclosed may be used in the field of tools training, operation, benchmarking, fitting, maintenance and/or resupply. The sensor system presently disclosed may comprise a wirelessly enabled motion sensing apparatus which monitors a tool user's operation and handling of a tool to determine areas for improvement. The sensor system presently disclosed may be used as a diagnostic tool to match the tool shape and operation to the user by measuring tool and operator movement. The sensor system presently disclosed may allow tool designers, builders, and operators to recalibrate and/or tune their tools for lowest operator fatigue and tool wear.

The sensor system presently disclosed may operate in standalone mode to log the tool user's performance and also track the performance of the tool. Tracking of the tool performance allows the sensor system presently disclosed to determine when the tool requires maintenance and/or resupply of consumables.

The sensor system presently disclosed may comprise one or more ports to communicate with Windows, IOS, Android and/or similar operating systems as an object attached motion tracking device for virtual and augmented reality and/or for real life object movement and use. Objects the sensor system may be attached to include consumer and industrial tools such as firearms, hand drills, jack hammers, etcetera. The sensor system presently disclosed may comprise a multi-axis motion sensors for detecting movement which maps to quaternions, Euler angles, rotation\matrices and/or similar systems that describe object physical status in 3D.

Figure 1A:
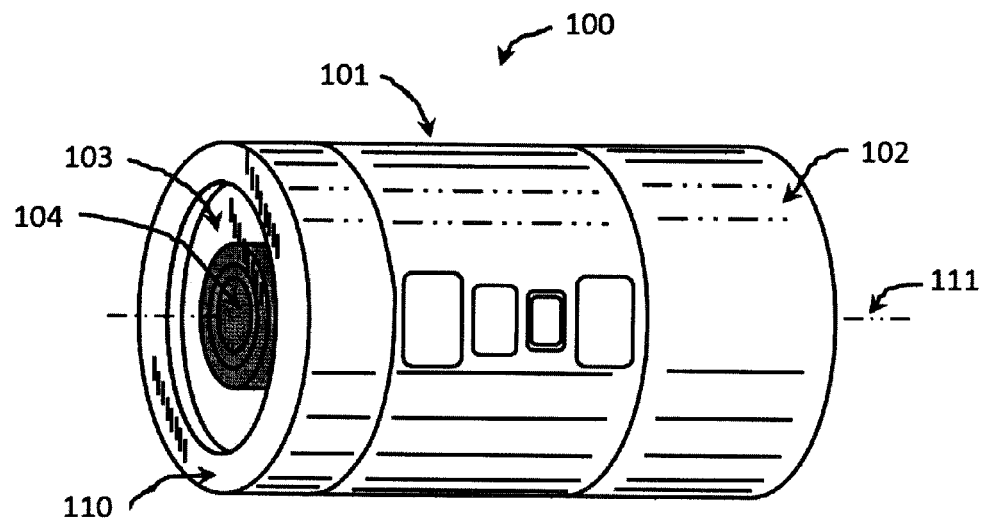
FIG. 1A illustrates a perspective view of a first end of one embodiment of the disclosure including a lens component positioned at an end of a cylindrical housing.

The disclosure includes an embodiment comprising a detachable component housing. The housing may be made of a material such as aluminum, plastic, carbon fiber, or composites that will not interfere with magnetic, electromagnetic, or other radiative fields. FIG. 1A illustrates a cylindrical housing 100 comprising a case 101, an end cap 114 and a rotating connecting collar 102. The case may be comprised of one or more removable pieces (e.g. a front case cap 114). A variety of processes may be used to create the components and subcomponents including machining, forging, explosive forming, 3D printing, static or dynamic (centrifugal) molding, etc. It will be appreciated that the components within the case may have a fixed orientation relative to the attached component (not shown). The rotating connector collar 102 comprises a female attachment that may thread over male threaded subcomponents of the attached component. The attached component may be static or portable.

FIG. 1A also illustrates an imaging capturing device utilizing electro-magnetic (EM) radiation, e.g. ultra violet, visible light or infra-red EM radiation. The imaging capturing device may include one or more lenses 104 positioned behind a transparent or translucent widow 103. The end face of the case 110 containing the image capturing device lens 104 may also contain a light, laser or other components. All sensors and/or emitters that breach the case wall, and all case and connector joints 600 may be made sealed to prevent gas or liquid infiltration of the device during use.

FIG. 1A also illustrates a line of sight 111 of the image capturing device. This line of sight may be congruent to the longitudinal axis of the cylindrical housing.

Figure 1B:
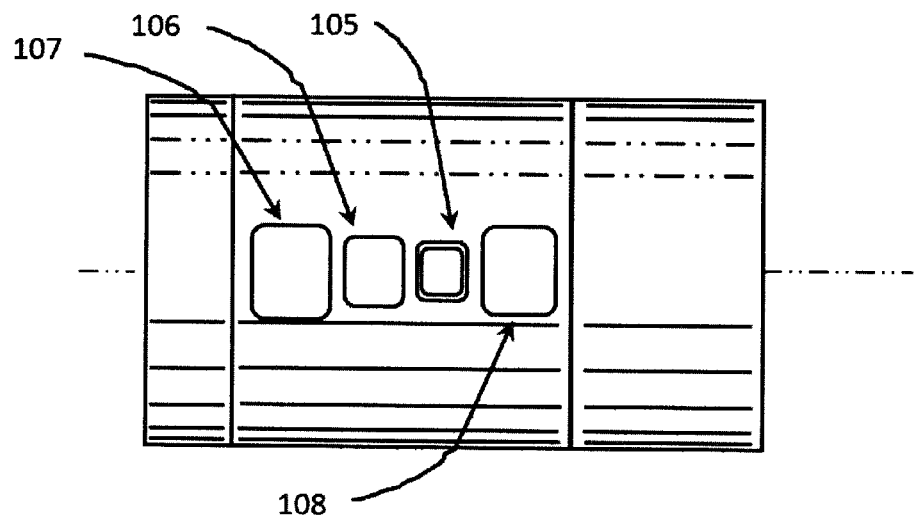
FIG. 1B illustrates on embodiment of the disclosure showing the position of various sensor system components on the outer wall of the housing.
Figure 9:
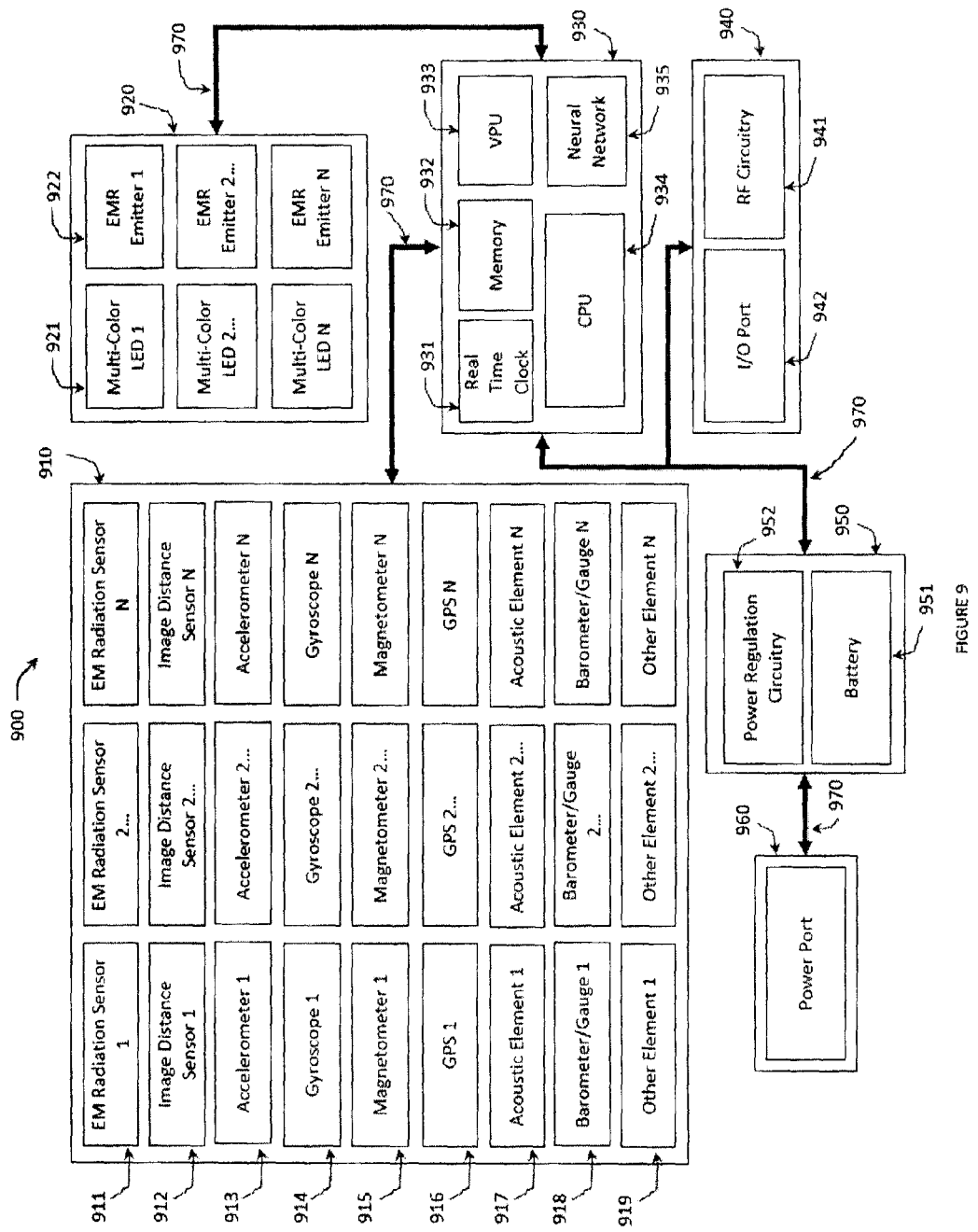
FIG. 9 depicts a block diagram of the multi-functional module system according to the present disclosure.

FIG. 1B illustrates a side view of the cylindrical housing 100 showing a subset of a variety of possible optional module subcomponents as shown in FIG. 9, e.g., an LED light 105, a barometer 106, a multi-circuit power/data input/output connector 107 and an RF aperture 108. The multi-circuit power/data input/output connector 107 shown in this embodiment holds the mating connectors together magnetically. In other embodiments, the mating connectors may be held together by means other than and/or in addition to magnetic. The multi-circuit power/data input/output connector 107 shown in this embodiment provides direct conductor-to-conductor contact. In other embodiments, the flow of power and/or data through the connector may be through non-contacting connections, one example being by induction. The connection may be designed such that no portion of the connector is visible on the case outer surface. The RF aperture 108 can be a plastic or other RF radiation transparent material. The housing may also contain controls for the internal subcomponents and focusing controls for the lens.

Figure 1C:
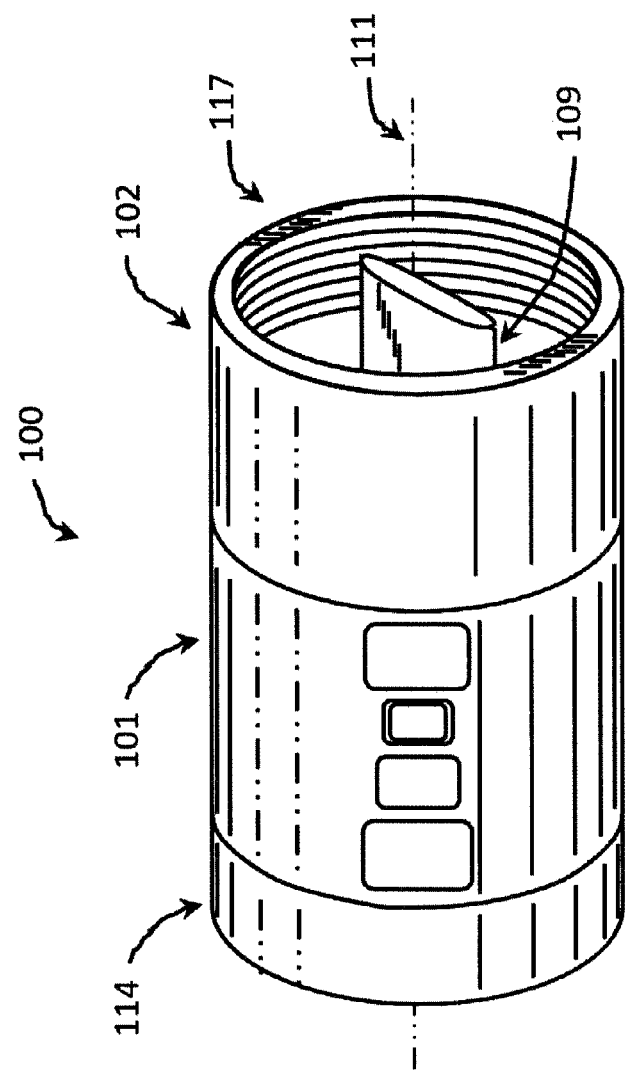
FIG. 1C is a perspective view illustrating a power/data input/output connector positioned at a second end of the cylindrical housing opposite the end of the lens component illustrated in FIG. 1A.

FIG. 1C illustrates the housing 100 and the connecting collar 102. Note the connecting collar allows the housing to be attached to another component without causing the housing to be rotated. This allows the aft end power/data input/output connector 109 to be attached to a reciprocal connector (not shown) with no relative rotation of the connectors. The power input/output connector design may vary depending on the requirements of the camera and/or subcomponents and is shown in this embodiment as a USB Type C connector. The connector may be co-incident with the camera line of sight 111 and/or the longitudinal axis of the cylindrical housing.

FIG. 2 illustrates the components of the device that are positioned inside the housing in one embodiment. Illustrated is the camera lens 104 of the image capturing device 201, camera EMR sensor 202 and camera electronics positioned on a printed circuit board (PCB) and additional camera electronics (shown in this embodiment as positioned upon a second PCB) 203. In another embodiment all camera subcomponents 104, 201, 202, 203, 204 and connectors 109 may be mounted on as few as one single PCB.

Also illustrated in this embodiment is a third PCB 204 mounted parallel and coincident to the PCBs of the image capturing device/camera 104, 201, 202, 203. The USB Type C connector 109 and other electrical components are mounted to this third PCB. In the embodiment shown, two wires 208 & 209 connect to the PCB 204 from a power input/output 107 directly or indirectly accessible from the exterior surface of the housing. See FIG. 1B. In one embodiment, the wires can power a battery recharger. Power for the electrical components may be supplied by wires 208 & 209, by one or more separate batteries, or a combination thereof.

Figure 3:
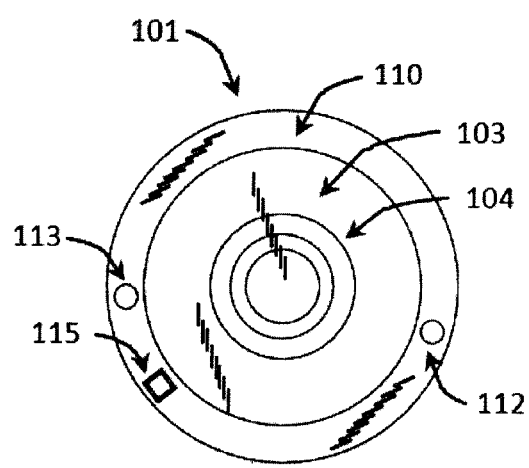
FIG. 3 illustrates a top view of the first end view of the housing showing the position of the front end cap 110, transparent window 103. I also shows the lens 104 of the image capturing device. Also shown is a lighting component 113, a laser component 112, and other generic sensors/emitters 115 that may be utilized in other embodiments of the device.

FIG. 3 illustrates a top view of the first end view in one embodiment of the disclosure. Illustrated is the case 101, window for the image capturing device (camera) 103, camera lens 104, end face plate 110 containing an optional laser 112 and light 113, or similar emitters or sensors 408.

The disclosure includes an embodiment wherein a PCB board 204 is positioned orthogonal to and concentric with the longitudinal axis 111 of the housing structure and the lens line-of-sight of the image capturing device. In an embodiment illustrated in FIGS. 4A & B, the PCB board 204 is circular in shape to be compatible with the shape and radius of a tubular housing. The lens of the image capturing device is positioned at a first end of the tubular housing. (The second end may contain connector components to join with a separate housing possibly containing one or more accelerometers, etc., as further discussed below.) An example of a suitable image capturing device is the ELP 720P Mini Digital USB CCTV Security Web Camera HD industrial Camera USB Android Linux Windows MAC with Manual focus CS Lens] USB Web Camera (see https://www.aliexpress.com/item/Black-box-Mini-Digital-USB-CCTV-Security-Web-Camera-HD-industrial-Camera-Usb-Android-Linux-Windows/32740101203.html). This device has the advantages of: 1) can have a form factor that fits inside a standard 1 inch diameter mounting attachment that allows it to be mounted on many standardized mounting systems; 2) generating images at a rate and resolution suitable for: a) effective use in regular and high precision virtual reality (VR) and augmented reality (AR) applications; b) effective use in regular and high precision monitoring, tracking, or recording of camera and/or attached component position and motion; c) effective use in image analysis and object identification; 3) has a highly resilient case that can withstand high impacts and extremes in pressure, vibration, temperature, environmental hazards, and submersion; 4) has shock absorbing and heat dissipating component and subcomponent encasement system and an intrinsically safe sealing system; 5) it can be used as an extreme environment camera/sensor module on guns, high impact tools, sporting equipment, military and law enforcement equipment, industrial plant, and marine equipment, etc.

The design facilitates a variety of lens types and configurations to accommodate various applications of the camera/sensor module, such as fixed, interchangeable, or variable focal length lenses, from wide-angle to high magnification zoom; as well as lenses designed for use in the full EMR spectrum. The lens may have coatings to enhance image sensor performance such as polarization, filtering, and non-reflective. In one embodiment the lens may be a separate externally mounted type (not shown) that mounts onto the front of the camera case. The circular PCB 204 provides both electrical components and functions as well as structural components and functions.

Structural aspects of this PCB include that it facilitates positioning and attachment of the image capturing device along the longitudinal axis of the cylindrical housing. In this embodiment, it also provides a base for the attachment of a USB Type C connector 109 or other connector along or near the longitudinal axis of the cylindrical housing. It will be appreciated that the circular PCB board, oriented along and perpendicular to the longitudinal axis, may be secured into this position by various methods such as embedding the PCB board, along with the illustrated additional PCB boards acting as subcomponents to the image capturing device, with a silicone or other suitable potting material. A mold, tape, or sleeve may be placed around the circumference of these PCB boards 202, 203 & 204 (See FIG. 2) during manufacturing and potting material infused into the internal voids, thereby increasing component heat dissipation and creating a secure structure resistant to vibration and contamination. This structure secures the integrity of the electrical components. See also the structural pins and solder pads 404 (See FIGS. 4A & B).

In addition, the electrical functions of this PCB board may include a conductive path 405, 406 for transmitting electrical power from/to the power/data input/output connector 109 (See FIG. 2). Additional conductive paths (not shown) may be included that transmit electronic signals from the image capture device to a hub, CPU, vision processing unit (VPU), or microprocessor or to other components that may be contained in the same or a separate housing structure. Such other components may be a rechargeable battery. See the electrical and structural connection slots to the camera's forward PCBs 402. The PCB board may contain subcomponents such as capacitors 403 to enable USB protocols, as well as capacitors 401 & 403 and inductors (attachable at) 406 that may dampen or otherwise condition power spikes, such as spikes from electrical current received from or sent to the magnetic connector described below. The PCB board may also contain subcomponents such as independent motion and position sensors for tracking and positioning of the module, and power controllers that allow the camera/sensor module elements to be placed in various power level modes when underutilized or dormant, illustrated generically as component 408.

Figure 4A:
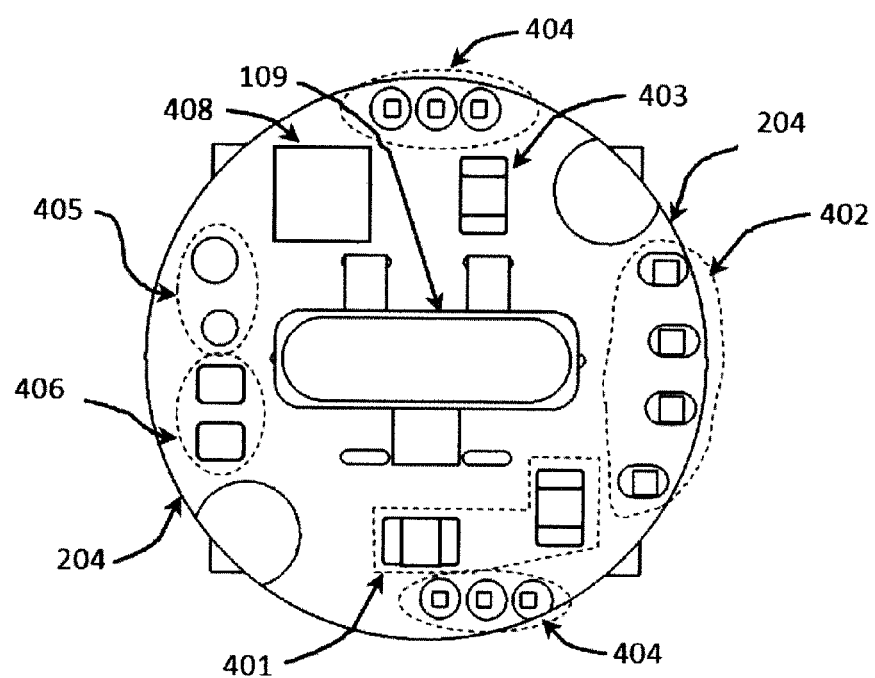
FIG. 4A is a top view of a printed circuit board (PCB) with electrical connector 109 and other subcomponents of the image capturing device.
Figure 4B:
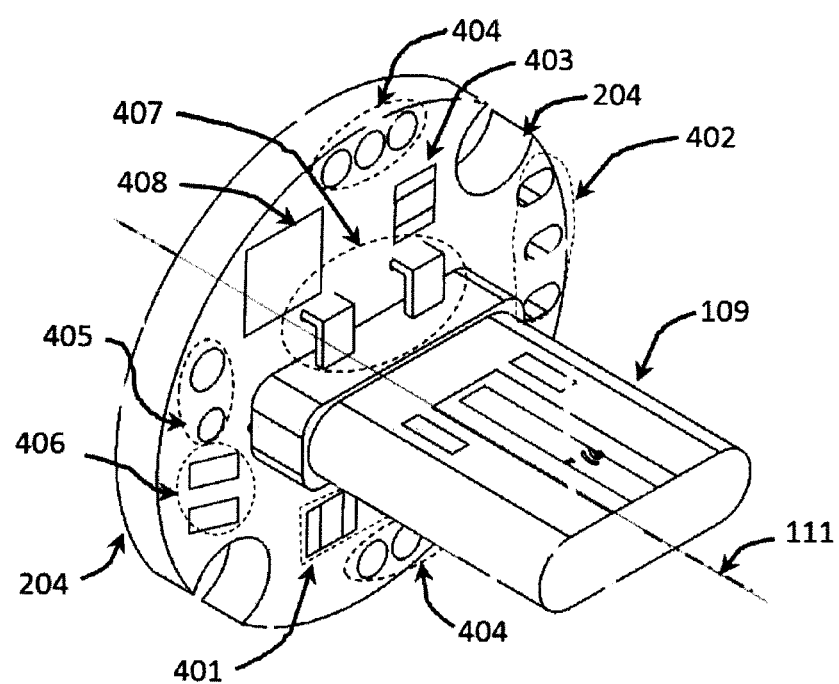
FIG. 4B is an isometric view of the second end showing the PCB shown in FIG. 4A.

FIG. 4A illustrates a perspective view of the PCB board 204 positioning the USB C type connector 109. The USB connector is shown in this embodiment to be held to the board with one or more brackets 407. Note again that the USB connector may be aligned with the longitudinal axis 111 of the housing.

Figure 6A:
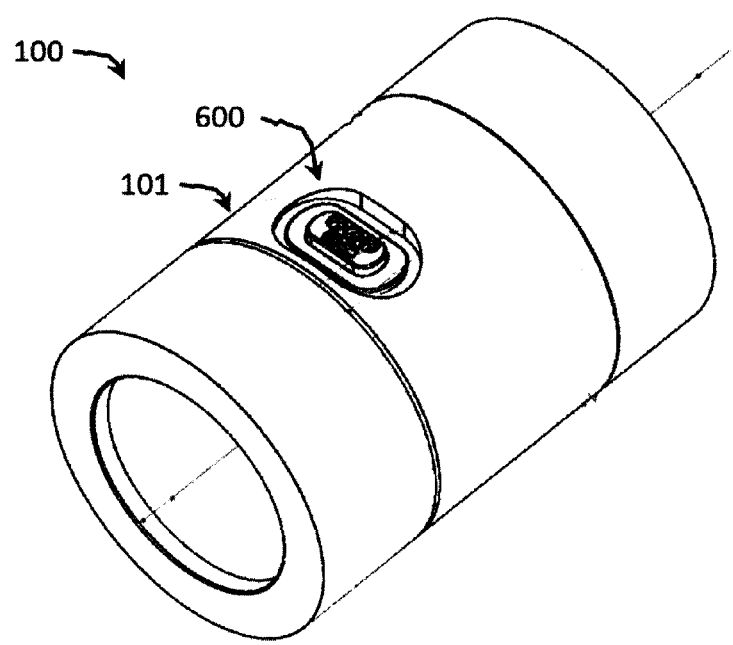
FIGS. 6A & B Illustrate perspective views of the power and/or data connector embodiment which may allow the fastening of external mating connectors, positioned at the outer surface of a cylindrical housing.
Figure 6B:
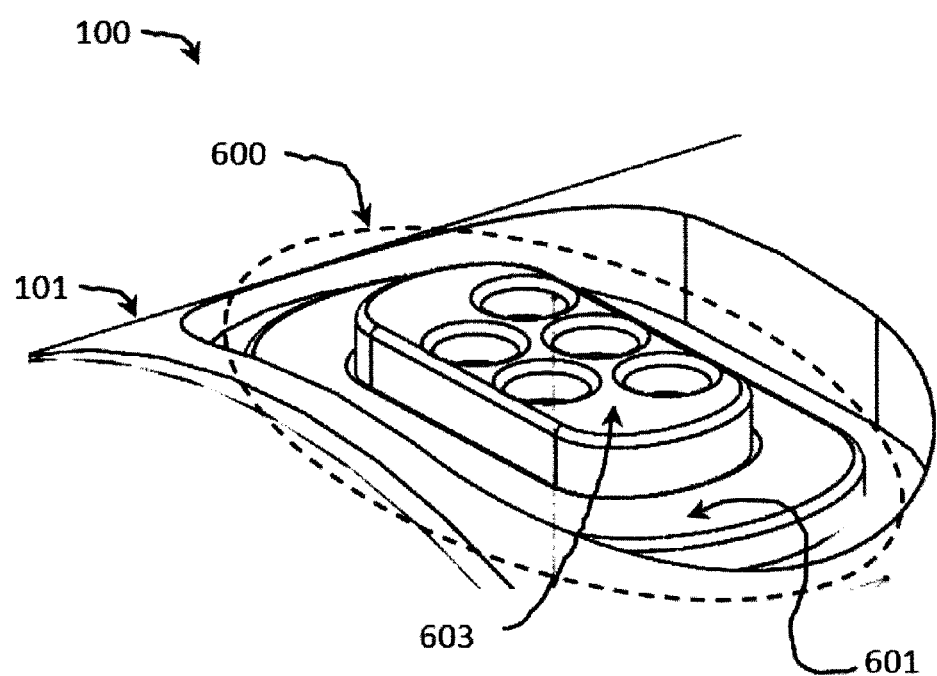
FIGS. 6C & D Illustrate orthographic views of the connector subassembly and associated wires.
FIG. 6E illustrates a detailed side view of the components of the electrical signal and/or power connection positioned at the outer surface of a cylindrical housing.
FIG. 6F Illustrates an orthographic front view of the electrical signal and/or power connection.
FIGS. 6G & H Illustrate side, top, bottom, and perspective views of a PCB (Printed Circuit Board) for mounting the magnetic connector to electrical wires and to the module case.
Figure 6C:
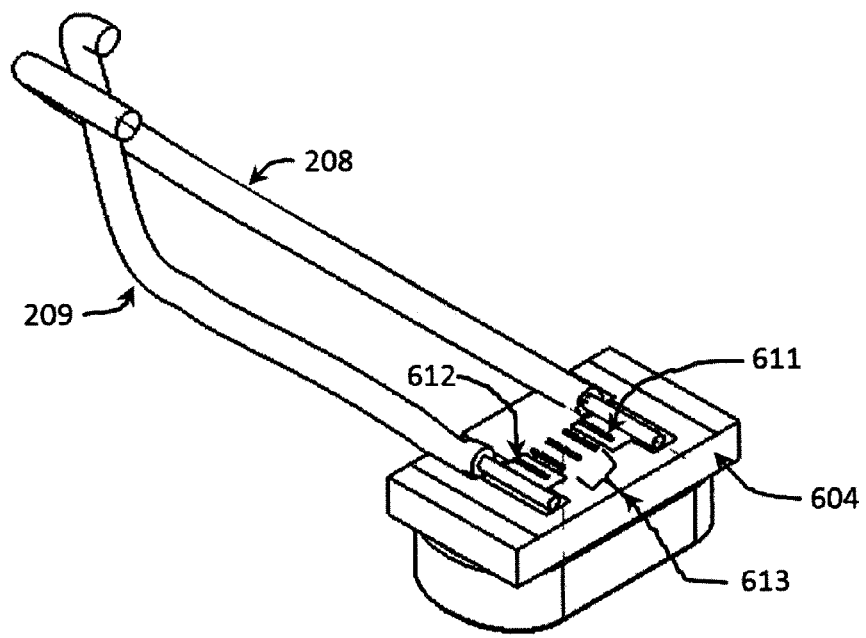
Figure 6D:
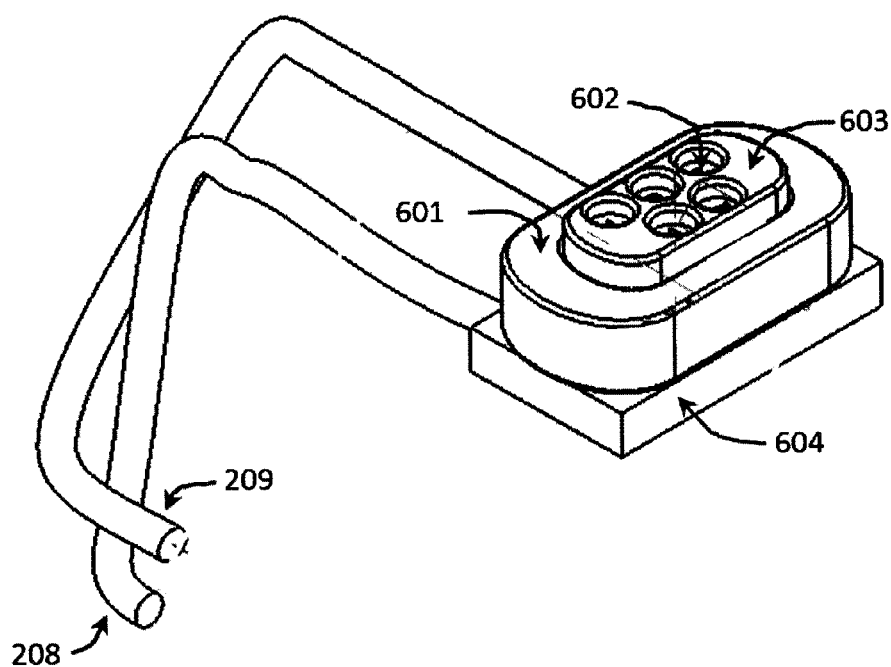
Figure 6E:
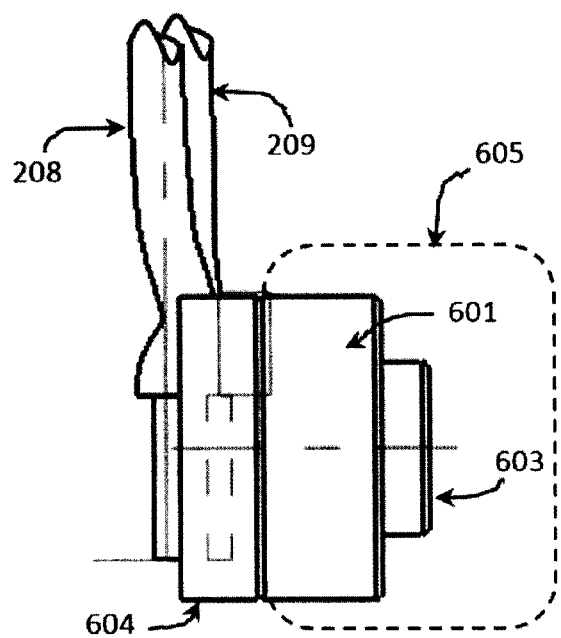

The device subject of this disclosure also pertains to a PCB board 604 as a component to a magnetic attachment 107 (and 601) (FIGS. 6E, G & H). The board also provides both electrical conductivity functions and structural functions. The structure and attachment of the board to the connector core 605 mitigates stress that may otherwise be experienced on the electrical conductors 602. Also the width of the board also is determinative of the radial positioning of the board and connector core 605 in relation to the curved side wall of a cylindrical housing. It will be appreciated that the proper dimensioning of the board, holding the connector, will allow the connector to be positioned flush with, or in a prescribed radial position relative to the outer surface of the cylinder wall. Also, the longitudinal width of the board also is determinative of the longitudinal positioning of the board and connector core 605 in relation to module internal components and wiring, and module casing internal and external features. The board may be rectangular or other shape. The board has conductor coated slots 611 and 612 (FIGS. 6G & H) that provide structural support to and control the position of connector electrical conductors to prevent conductor breakage, adjacent conductor contact, and electrical shorts. The slots also provide positive fastening of the board to the connector through solder joints and other bonding methods. The board also has notches 615 and 615 that allow associated wires 208 & 209 to be inlaid in the PCB to reduce the profile of the assembly and to provide a means to route and fasten the wires directly to the board to reduce wire solder joint loads during assembly and normal use. Additional board slots 613 are provided to increase bonding access and surface area between the board and the connector/magnet assembly 605. The board also has conductive pads 616 and 617 which tie into the adjacent conductive slots 611 and 612, and onto which wires 208 and 209 may be soldered. The pads provide structural support for the wires such that wire loads are not transferred to the connector terminals soldered into their respective slots 611 and 612.

The PCB board 604 provides electrically conductive slots for conductive prongs or contacts on the inner side of the magnetic connector. The conductive components may be connected to the PCB board assembly discussed above (illustrated in FIG. 2). This connection may utilize wires 208 and 209 positioned between the magnetic connector PCB board 604 and the aft PCB 204 board illustrated in FIG. 2. The board structure may facilitate positioning of these wires. The magnetic connector board 604 serves in the function of possibly providing power, data, and other electronic communications to other boards such as 204.

In another embodiment, the device may include a CPU, VPU, or microprocessor positioned within the housing. It will be appreciated that the structural dimensions and shape of each PCB boards efficiently uses space within the housing. This can create adequate space for the positioning of an additional PCB board(s) containing CPUs, VPUs, or microcontrollers. [078]. In an embodiment, the CPU allows signals received from the image capturing device to be analyzed or evaluated within the camera/sensor module. This can produce higher level camera/sensor module outputs (such as quaternions, image recognition results, curated medical records presentation, etc.) that reduce the computational load on connected systems, thereby making the overall system quicker and more compact, capable, and efficient. This evaluated data may be shared with the data of accelerometers, etc., that may be contained in the same or a separate but connected device component.

In one embodiment, this device may be used in conjunction with the tool described in U.S. Pat. No. 10,041,764 issued to Han Shyone Ooi on Aug. 7, 2018, entitled "Sensor System and Method for Sensing Motion". The U.S. Pat. No. 10,041,764 is incorporated by reference herein in its entirety.

FIGS. 6A-F illustrate views of a connector component that is positioned at the side of the housing. The component includes a magnetic subcomponent 601 positioned proximate to a housing side wall (not shown). The magnet subcomponent can hold complementary external connectors to the side wall connector component. Five external conductors 602 are secured in place by conductor mount 603. In a preferred embodiment, the outermost edge of the conductor mount 603 inside the magnetic component is flush with the housing wall OD. The magnetic component is attached to a PCB board 604. The inner surface of the board contains connections 611 & 612, holding wires 208 & 209 which are attached to the PCB board 204 illustrated in FIG. 2. In the embodiment illustrated, there are three additional connectors 613 that may be connected by wires to other PCBs in other embodiments.

FIG. 6E illustrates a side view of the side wall connector component including the connector core 605 (comprised of the magnetic side component 601 and the conductor mount 603), PCB board 604, and wires 208 & 209.

Figure 6F:
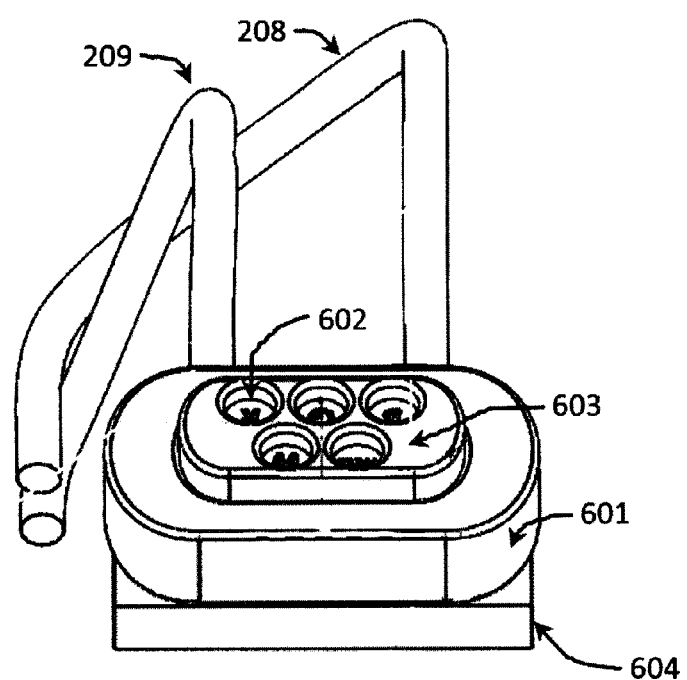

FIG. 6F illustrates a front view of the side wall connector component showing 5 connector subcomponents 602 retained in a non-conducting pliable conductor mount insert 603 surrounded by the magnetic component 601. Also shown are wires 208 & 209. The wire may be attached to a battery charger via the PCB board 204 and the USB type Connector 109. (See FIG. 4A)

FIGS. 6G & H are further multi-perspective views of a side wall magnetic connector subcomponent. Illustrated is one embodiment of the Applicant's PCB board 604 showing "cut outs" or notches 614 & 615 that facilitate placement of wires into the compact space available between the electronics package and the adjacent housing ID walls. When assembled, wires are soldered to conducting pads 616 and 617, and conductors are soldered into the coated slots 612 and 611, creating a completed circuit from the external conductors 602 through the PCB and to the wires which are soldered to the electronics package aft circular PCB 204.

Figure 7:
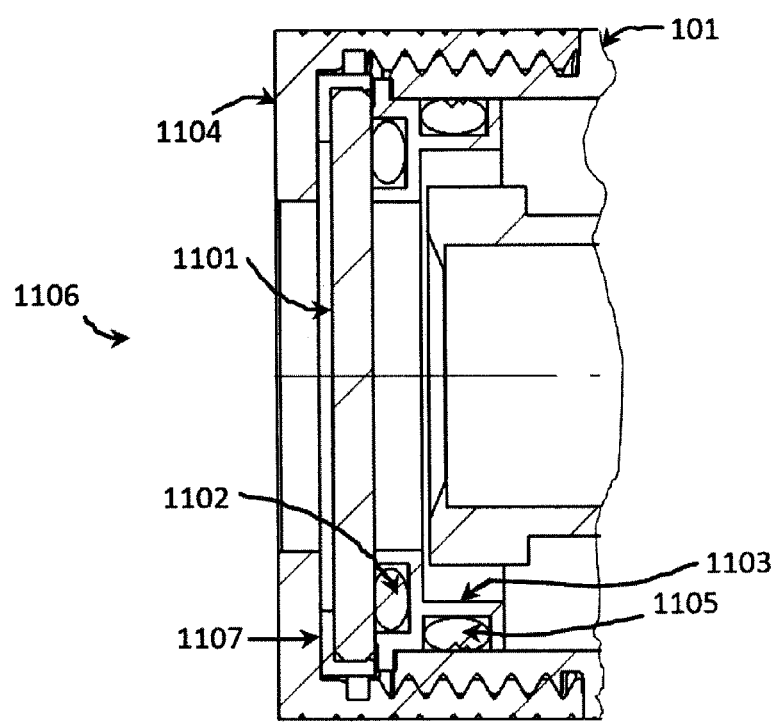
FIG. 7 Illustrates a side view of the image capturing device, including the Applicant's placement of two O-rings and a window-edge sealing gasket for sealing of the image capturing device and other electronics within the housing.
Figure 8:
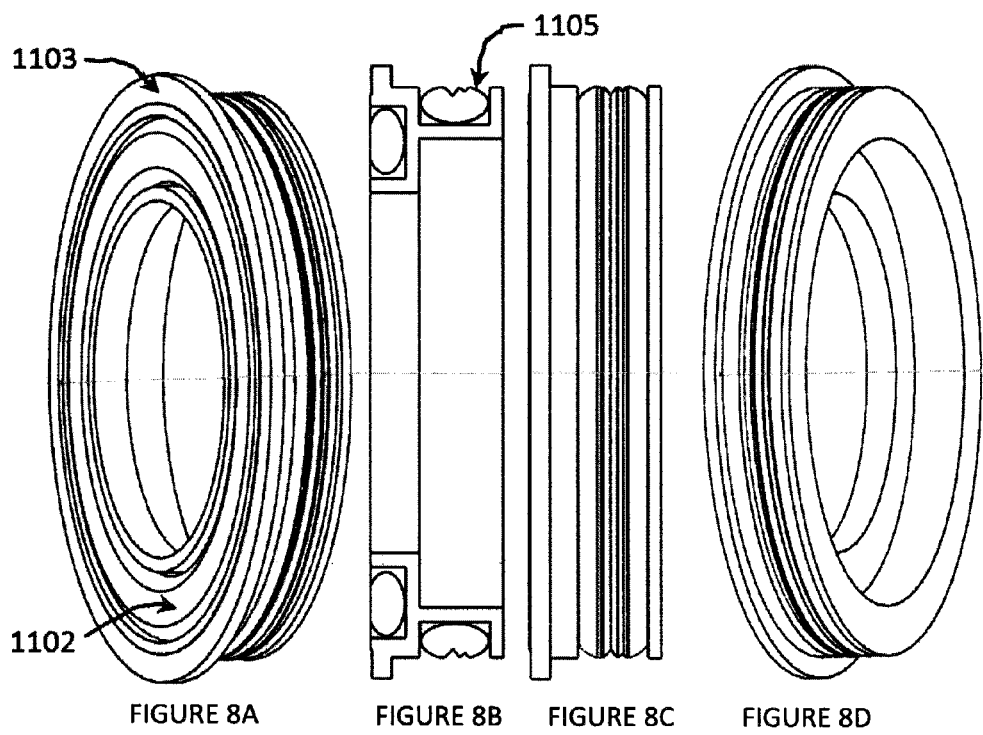
FIGS. 8A-D Illustrate a front perspective view, a cross section view, a side view, and a back perspective view of a Window and Case seal carriage arrangement.

FIG. 7 is a side view of the first housing end 1106 and illustrating the Applicant's two O ring configuration 1102 & 1105 for gas, vapor, and liquid sealing of the module contents and a window 1101. The O-rings are held in place by a connector seal carriage 1103. The first O-Ring 1102 seals the interior face of the window 1101. The O-ring may press against the window and the forward face of a concentric slot in the seal carriage 1103. In the embodiment shown the seal carriage is held in place between the window and the case 101 by tightening the window retaining collar 1104 onto the case 101. A second O ring 1105 seals the module contents at the case 101 inside wall. This second O ring may press against the inside of cylindrical housing case 101 and the side of the metal carriage 1103 situated inside and concentric to the housing case 101. An additional sealing gasket 1107 on the outer surfaces of the window between the window and the adjacent surfaces helps seal the first housing end 1106 and protects the window from damage caused by contact with adjacent hard surfaces. The window 1101 may be made of a variety of materials and/or have coatings that are non-reflective, wavelength tunable, damage resistant, filtering, polarizing, etc. The window retaining collar 1104 may include a shield feature (not shown) that deflects material that might otherwise impinge upon the window. The system may have a cover that provides full or partial covering of the module forward end. It will be appreciated that other configurations may be employed.

One embodiment of this camera/sensor module would use a VPU comparable with the Intel Movidius Myriad 2 or Myriad X. According to the manufacturer—the Myriad X has a Neural Compute Engine and 16 SHAVE cores and an ultra-high throughput intelligent memory fabric that make the Myriad X the industry leader for on-device deep neural networks and computer vision applications. The Myriad X has a new native 4K Image Signal Processor (ISP) pipeline with support for up to 8 High Definition (HD) sensors connecting directly to the Myriad X VPU. The Myriad X is programmable and allows implementation of custom vision, imaging, and deep neural network workloads on the chip. Key benefits of the Myriad X are Dedicated Neural Compute Engine, 16 High Performance SHAVE Cores, Enhanced ISP with 4K support, and New Vision Accelerators including Stereo Depth. This allows the camera/sensor module to preprocess great amounts of sensor data from at least 8 HD image sensors of various types and wavelengths and thereby provide the module with industry leading capabilities while reducing the workload on other system CPUs—freeing up capacity for other non-vision/image related tasks. This allows the module to perform or support high level workloads such as object identification, recognition, and characterization; as well as guidance, navigation, and control—and thereby provide high-level information about and operating in the environment.

Figure 5A:
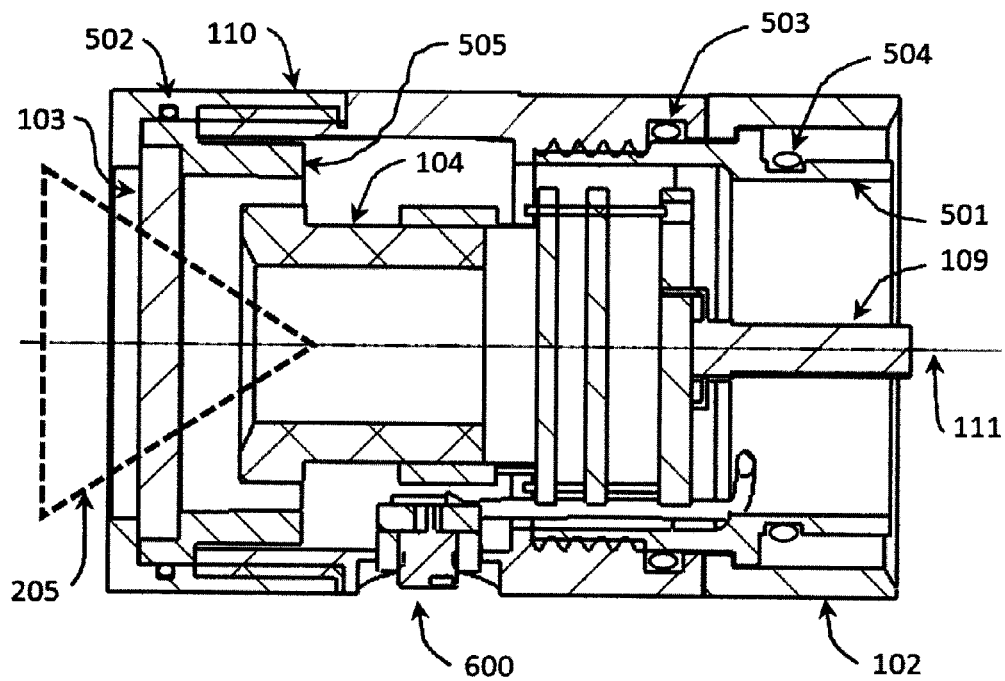
FIG. 5A illustrates a side cross sectional view of the module image capturing device including a lens 104 at the first end and associated electrical components positioned within a cylindrical housing 100. Also shown is a transparent window 103, a window retainer/positioner 505 that also acts on the incoming EMR to eliminate undesirable reflections, and an electrical connector 600.

FIGS. 5A & B: The module may be connected to associated hardware using a variety of means including physical, electrical, and electromagnetic. One means for connecting the module in the tubular form includes a concentric physical and electrical connection that provides positive electrical and tight rigid physical connection as shown in FIGS. 5A & B. This joint embodiment enables secure and sealed attachment of the module to a complimentary mounting feature (MF) without requiring rotation of the module relative to the MF. This allows any connections across the joint to stay longitudinally aligned throughout the connection mating process which occurs during the module attachment process. This permits the use of multiple separate nonconcentric connectors as well as noncircular connectors such as the USB Type C connector 109.

The use of O-Rings 502, 503 & 504 (or other cross-section seals) inside joined coaxial surfaces to provide a seal is an improvement over use of O-Rings on the ends of joined abutting pieces whose proper function depends on proper yet variable joint fastener tightness. The improved design provides positive sealing that does not depend on other joining feature position or tightness. When the mating coaxial surfaces overlap the O-Ring, the seal is established and maintained regardless of other connection features. Multiple O-Ring seals may be used at each location.

Figure 4C:
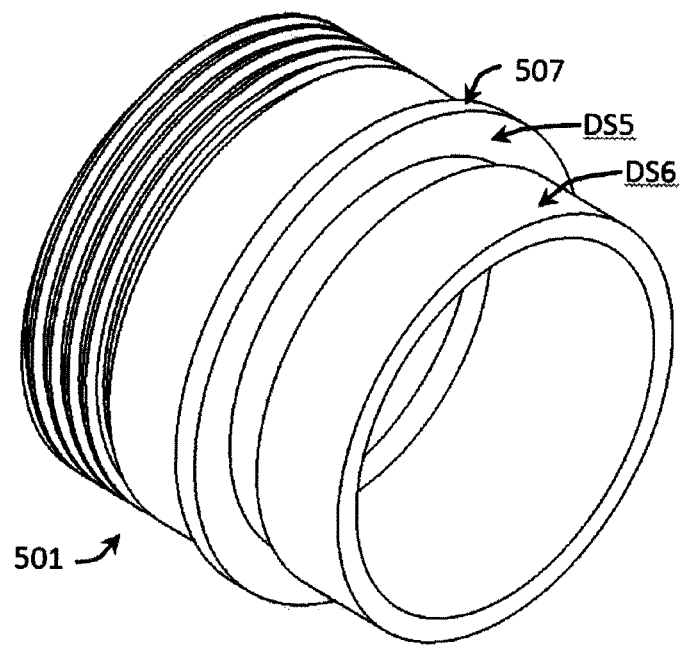
FIG. 4C is an isometric first end view of the case coupling 501 showing the coupling circumferential step 507.
Figure 4D:
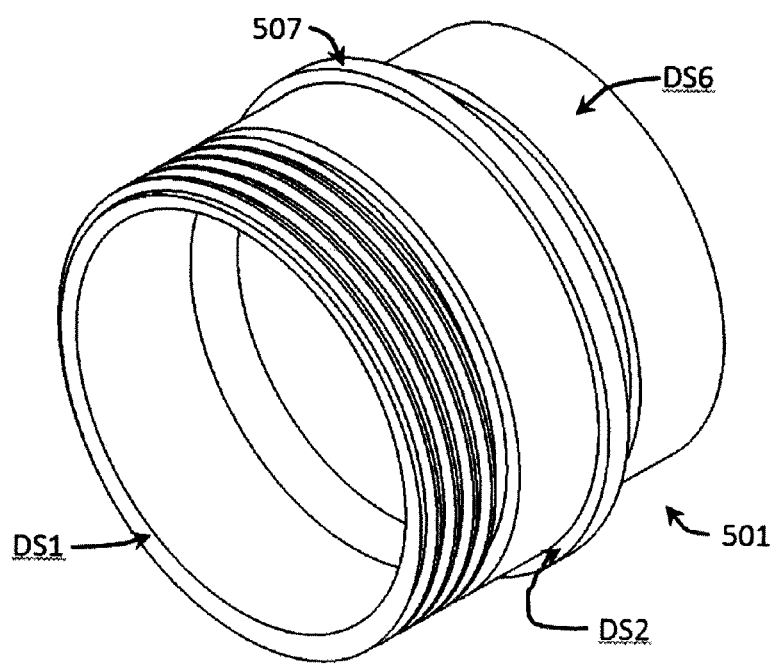
FIG. 4D is an isometric second end view of the case coupling 501.
Figure 4E:
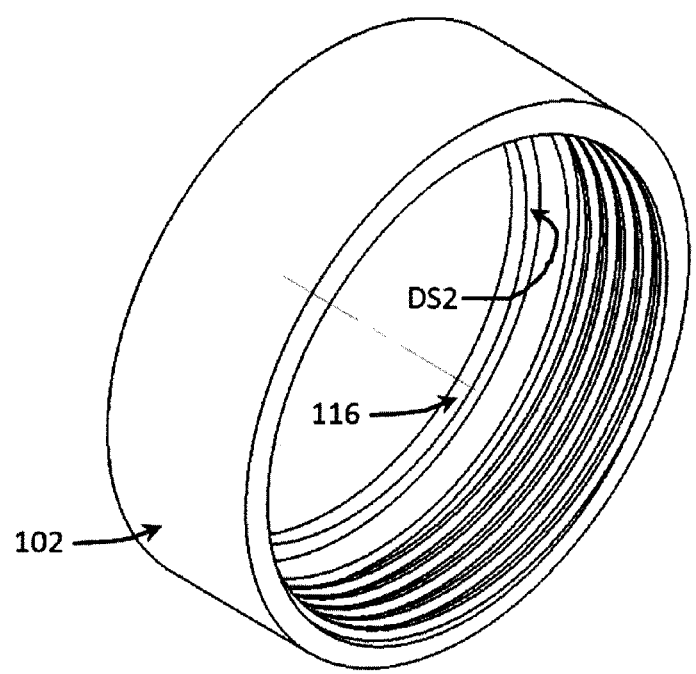
Figure 4F:
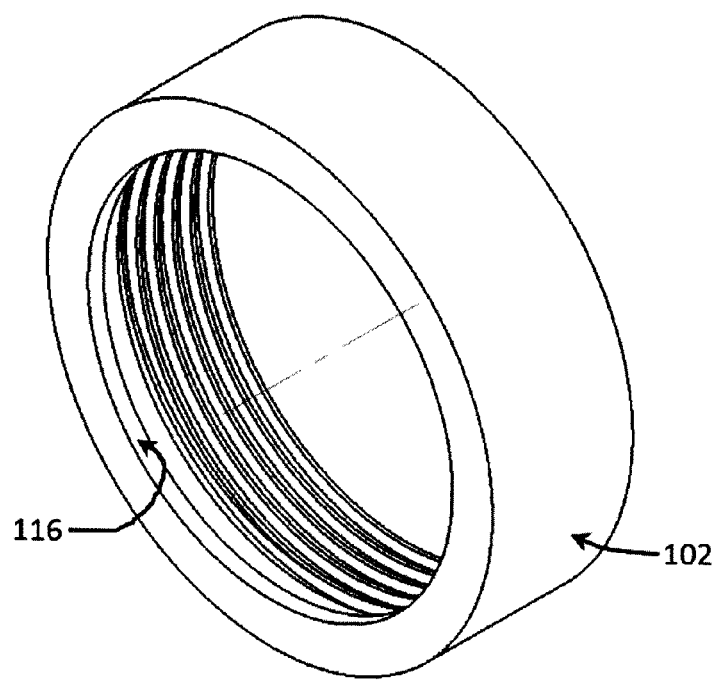
Figure 5B:
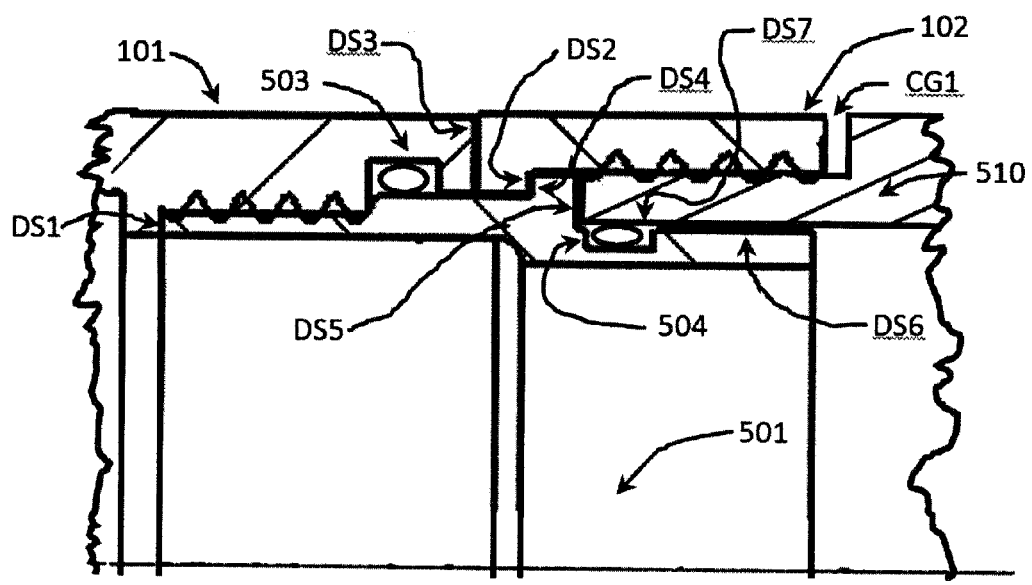
FIG. 5B Illustrates a side cross sectional view of one embodiment of the module-to-module mount joint.
Figure 5C:
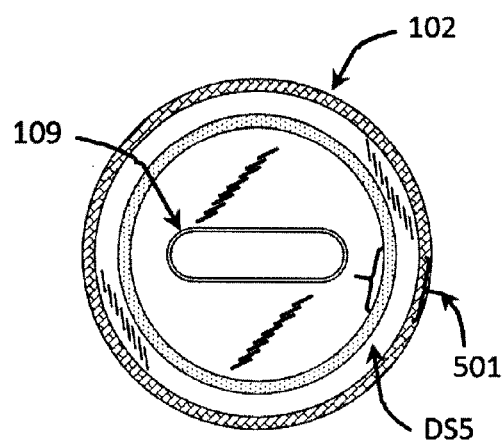
FIG. 5C Illustrates a top view (second end) of the module.
Figure 5D:
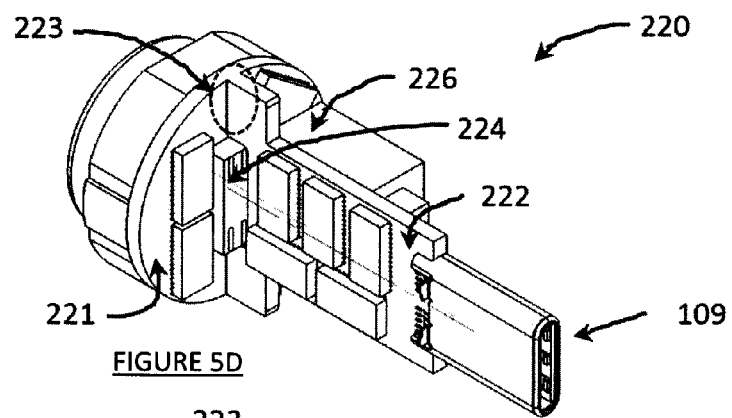
FIGS. 5D-G Illustrate plan and orthographic views of an embodiment of the module image capturing device and associated electrical components such as IPU, VPU, Memory, CPU, sensors, emitters, receivers positioned on multiple connected non-parallel PCBs configured to be contained within a cylindrical housing.
Figure 5E:
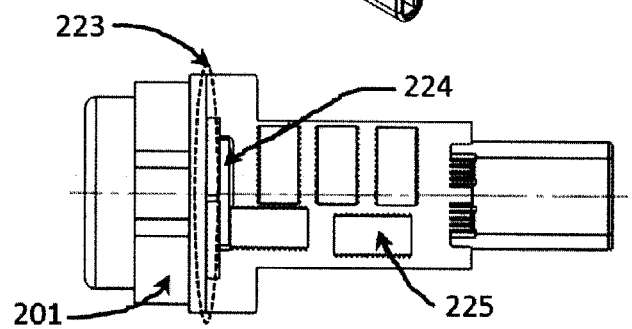
Figure 5F:
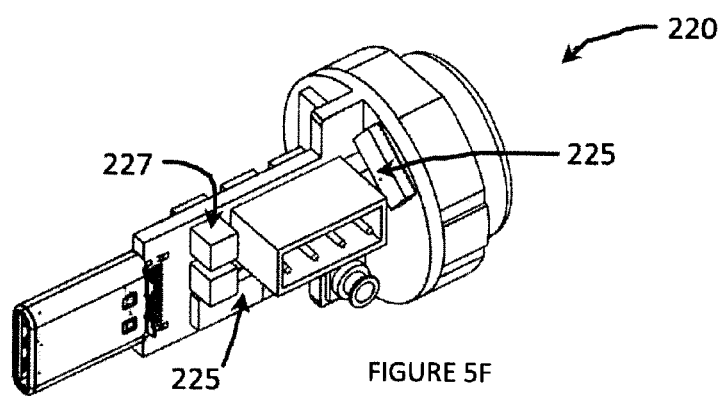
Figure 5G:
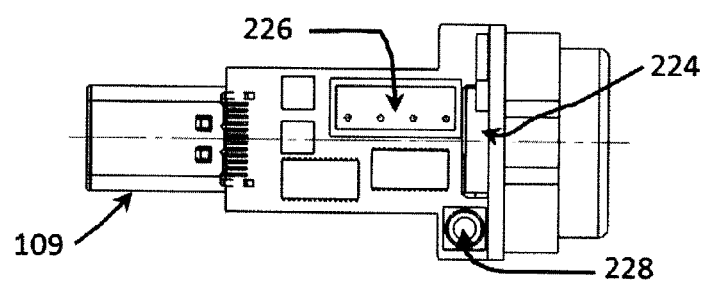
Figures 5H, 5I:
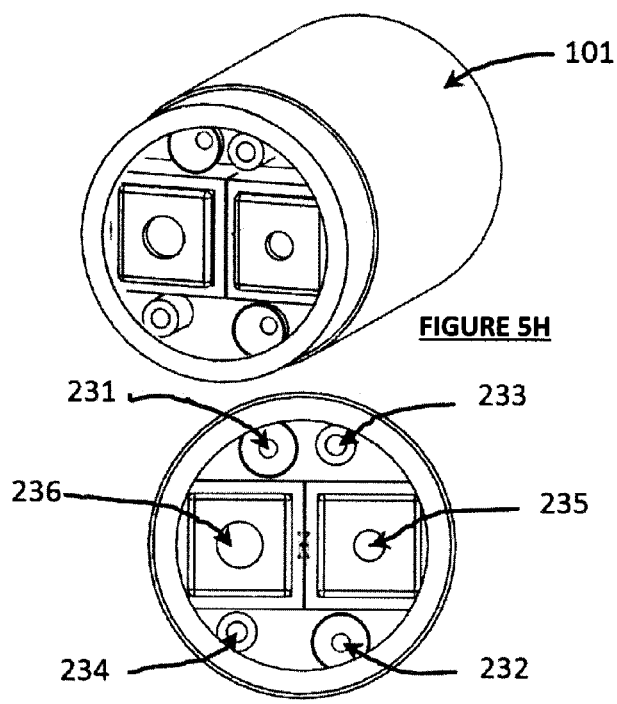
FIGS. 5H-K Illustrate views of a multi-image-sensor embodiment of the module image capturing device and associated electrical components such as IPU, VPU, Memory, CPU, sensors, emitters, receivers positioned on multiple connected non-parallel PCBs configured to be contained within a cylindrical housing.
Figures 5J, 5K:
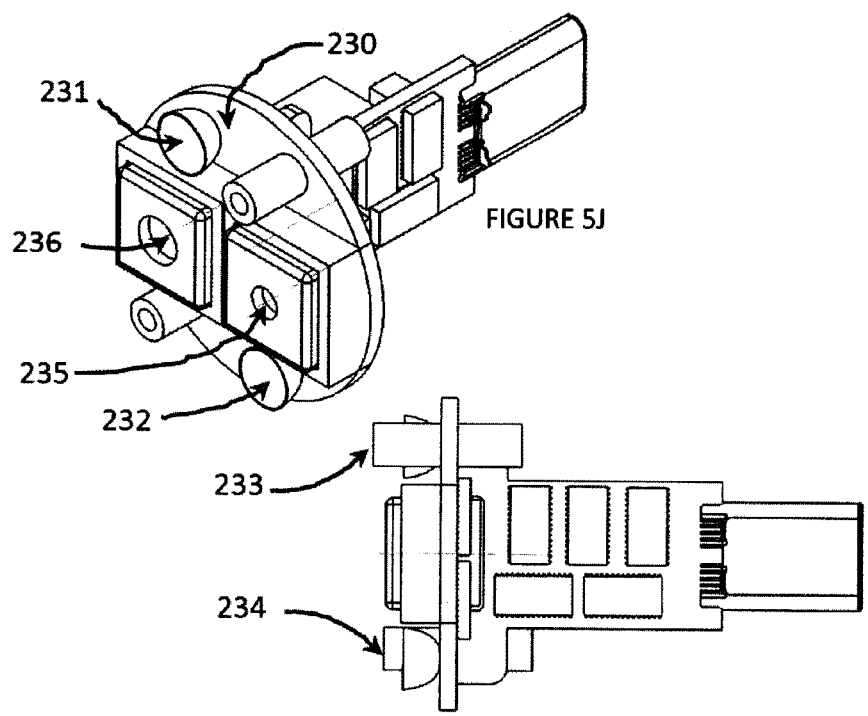
Figures 10A, 10B:
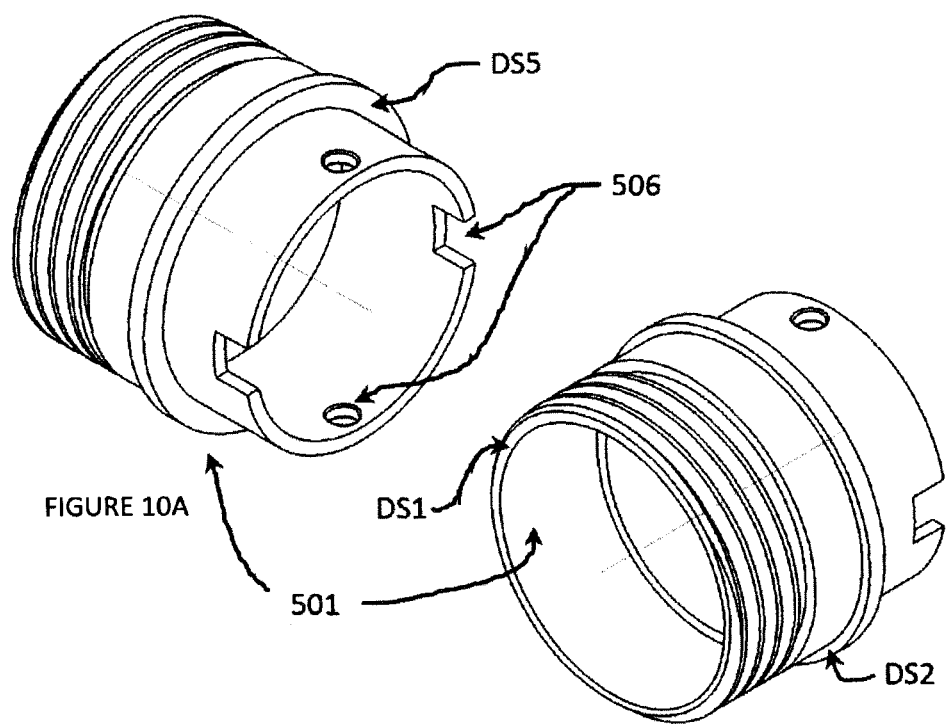
FIGS. 10A & B Illustrate front and back perspective views of the threaded joint coupling with retaining step, rotational indexing notches, tool engagement holes and installation depth control datum.
Figure 11A:
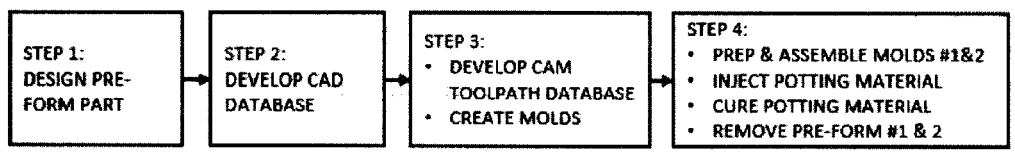
FIG. 11A Illustrates a Pre-form potting part manufacturing process.
Figure 11B:
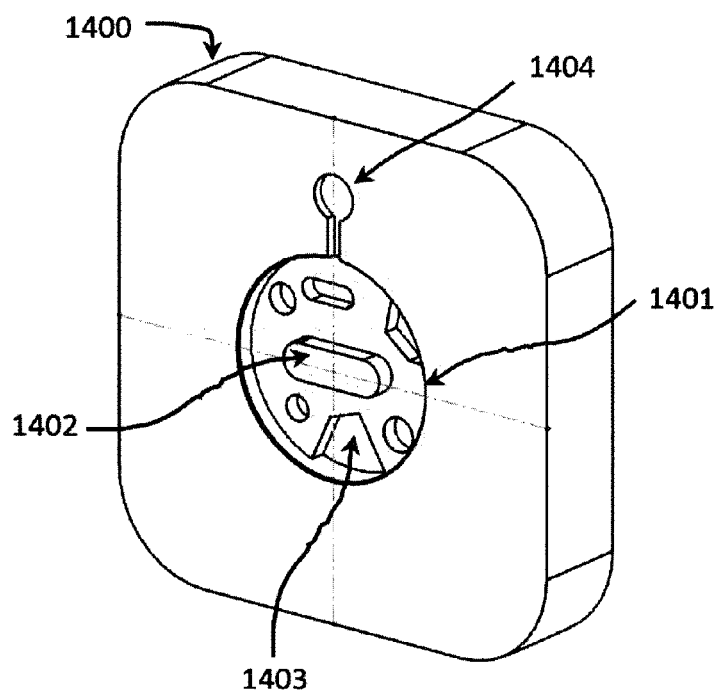
FIG. 11B Illustrates a complex pre-form potting part mold.
Figures 11C, 11D:
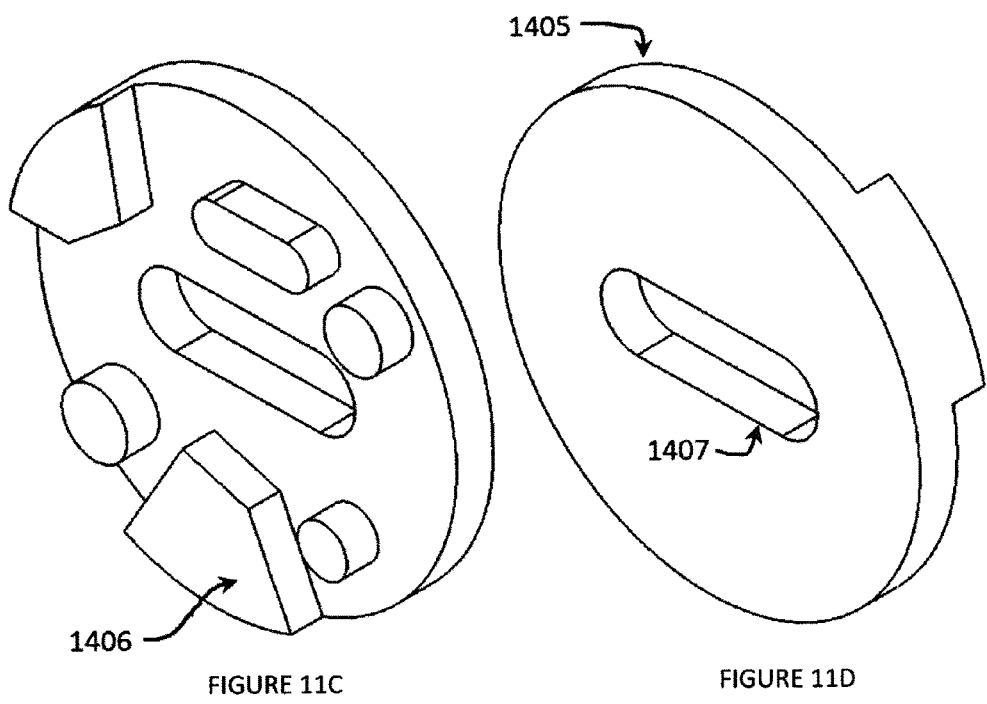
FIGS. 11C & D Illustrate a complex preformed potting part.
Figure 11E:
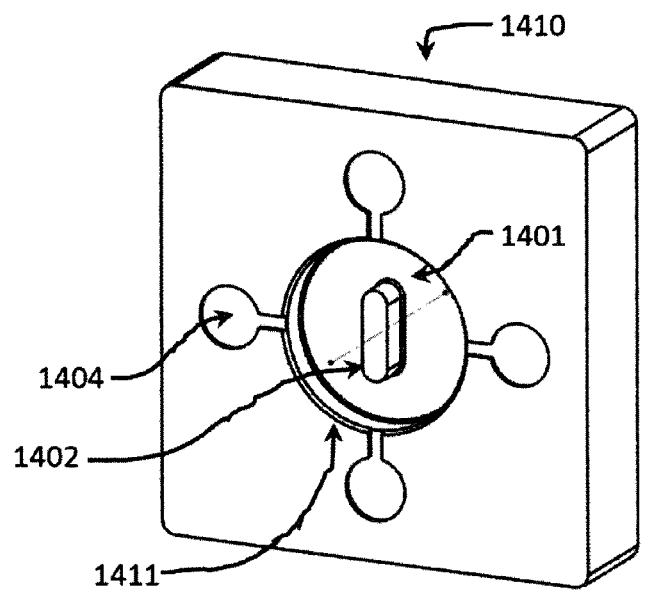
FIG. 11E Illustrates a simple pre-form potting mold.
Figures 11F, 11G:
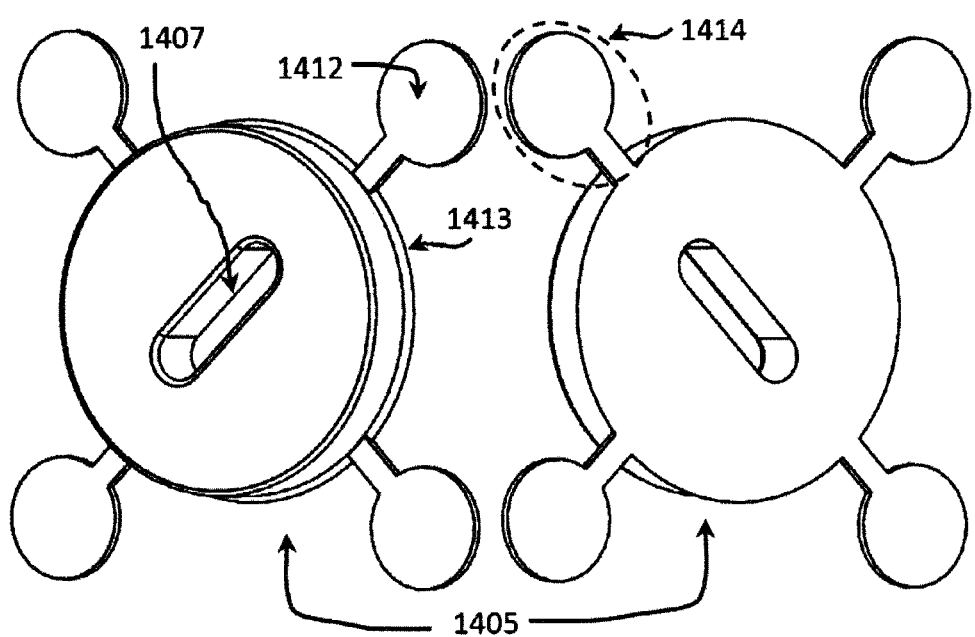
FIGS. 11F & G Illustrate front and back perspective views of a pre-formed potting part.

The removable threaded joint coupling 501 (FIGS. 4C & D) provides a convenient means of installing a rotating connector collar 102 (FIGS. 4E & F) that holds the module tightly to any object to which the module is connected. It also may provide O-Ring seal mating surfaces (see 504). The coupling design has large Internal Diameters (IDs) that maximize the unobstructed space between joined objects. This also maximizes the space available for subcomponents and potting materials, and facilitates module assembly. High strength material may be used in the coupling to allow it to maintain shape and functionality under high loads while minimizing coupling wall thicknesses. The unthreaded coupling end DS6 inserts into an adjoining annulus DS7 so as to precisely align the centerline of the module and may transmit axial loads coincident with the module centerline and torque loads perpendicular to and concentric with the module centerline. This serves to minimize relative motion between joined pieces. The coupling has a DS (Datum Surface) DS1 that controls the depth to which the coupling penetrates the mating hardware 101. This datum ensures proper insertion and connection of electrical connector 109 contacts and prevents overloading the electrical and/or other connectors with compressive forces. The Datum also controls the longitudinal location of subcomponents relative to the mated hardware. The outer circumferential step 507 (FIG. 4D) on the coupling 501 serves to hold the rotating connector collar 102 (via the circumferential step 116, FIGS. 4E & F) onto the module as well as provide a Datum DS4 that controls the alignment and longitudinal position of the collar 102 at Datum DS2 to ensure precise fits required to produce a strong effective joint. The distance from the coupling outer circumferential step Datum DS4 to the front of the coupling threaded end DS1 controls the clearance gap CG1 between the collar 102 and the adjacent mounting fixture 510 back face. The front face of the coupling is a Datum DS1 that controls the depth to which the coupling penetrates the case 101. The back face of the case 101 (DS3) and of the case inner step DS1 are Datum that, combined with the coupling collar 102 Datum DS2 and the coupling 501 outer step 507 forward face Datum DS4, ensure proper clearances for proper operation of the collar 102 during module attachment and removal. The outer and inner diameters of the coupling outer circumferential step 507 and the collar 102 inner step 116 are precisely controlled to ensure sufficient surface contact area and supporting material exists to provide structural strength and smooth operation of the collar 102 and support the mating surfaces. The Datum DS5 on aft face of the circumferential step 507 (FIGS. 5B & C), controls the longitudinal position of the complimentary mounting feature 510. The aft end of the threaded joint coupling 501 may have features that receive joint tightening tools. See FIGS. 10A & B Items 506.

FIGS. 5D-G Illustrate an example multi-function electronics package configuration 220 featuring multiple types of components such as an imaging sensor 224, electrical connectors 226 & 109, large surface area longitudinal PCB 222 connected rigidly or flexibly at 223 to an orthogonally oriented PCB 221. Also shown are a lens mount 201, generic ICs (integrated circuits) 225, generic environmental sensors 228, and generic electronics components 227.

FIGS. 5H-K Illustrate views of a multi-image-sensor and multi-emitter embodiment of the multi-functional device including multiple image capturing components and associated electrical components such as IPU, VPU, Memory, CPU, sensors, emitters, and receivers positioned on multiple connected non-parallel PCBs configured to be contained within a cylindrical housing. Included are a main sensor/emitter PCB 230, visible light emitter 231, non-visible light emitter 232, visible laser emitter 233, non-visible laser emitter 234, visible light image sensor 235, and non-visible or low light imaging sensor 236.

Alternate Joint Design

FIGS. 5L-5V illustrate a module Alternate Joint Design (AJD) attachment design variation that helps ensure proper alignment and seating of the connectors and seals at the joint; rapid joint connect and disconnect; rapid fastening of joint with non-friction-dependent positive locking arrangement.

Figure 5L:
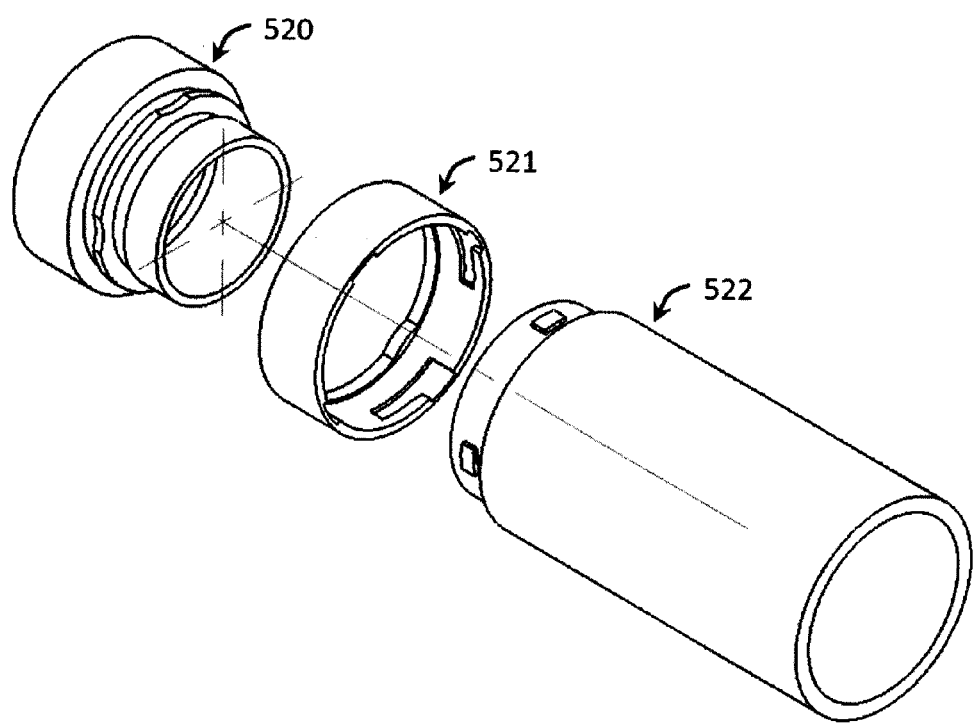

FIG. 5L illustrates an exploded view of the AJD comprised of a modified module case 520, a modified connecting collar 521 (also elsewhere designated 540), and a modified mating structure 522.

Figures 5M, 5N:
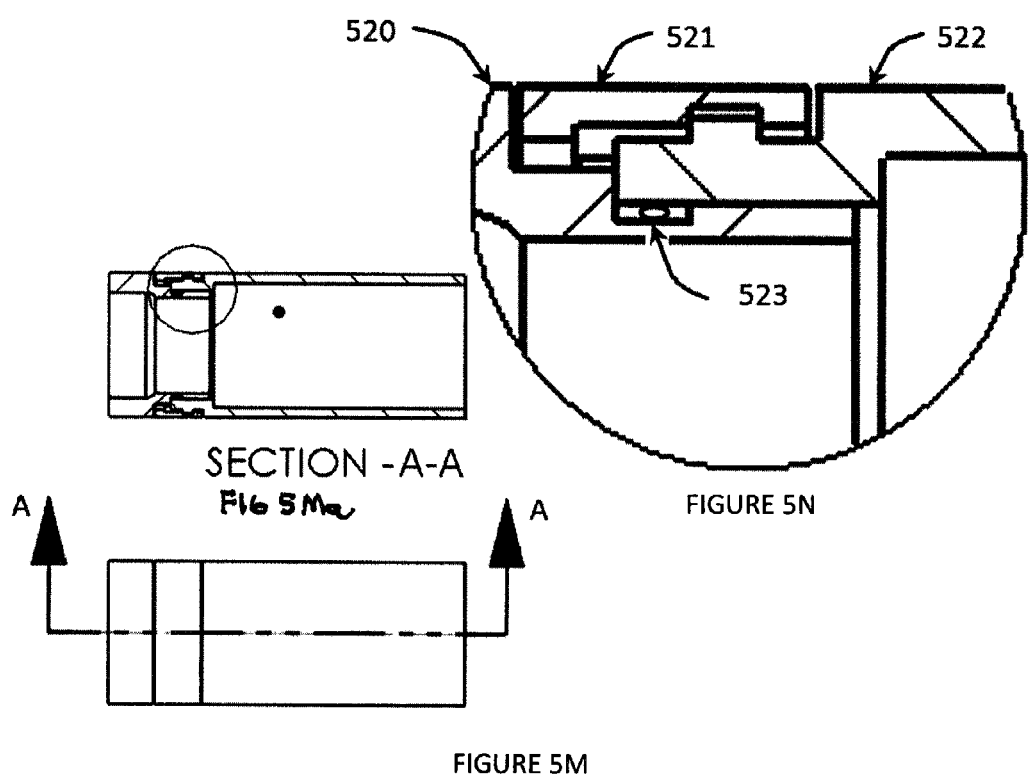
Figure 50:
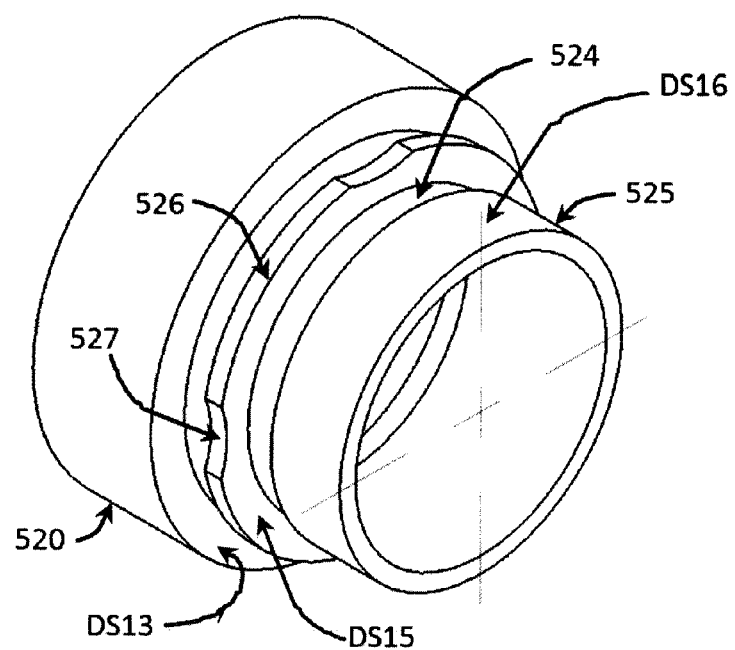
Figure 5P:
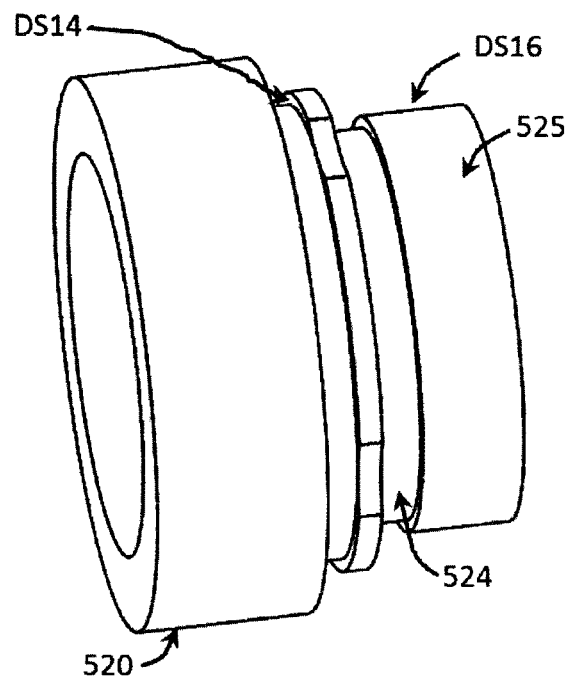
Figure 5Q:
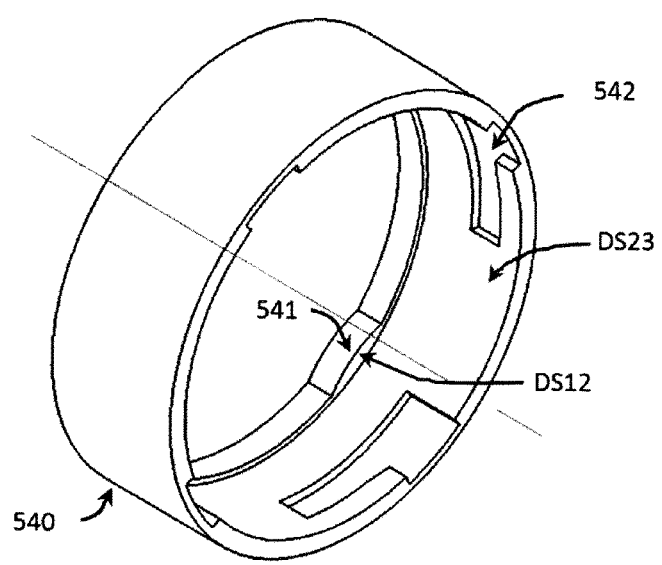
Figure 5R:
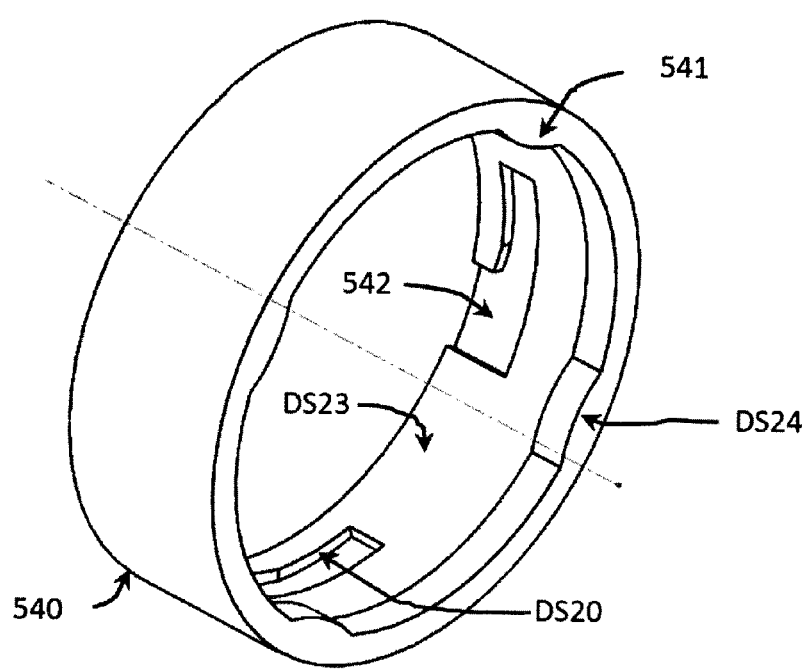
Figure 5S:
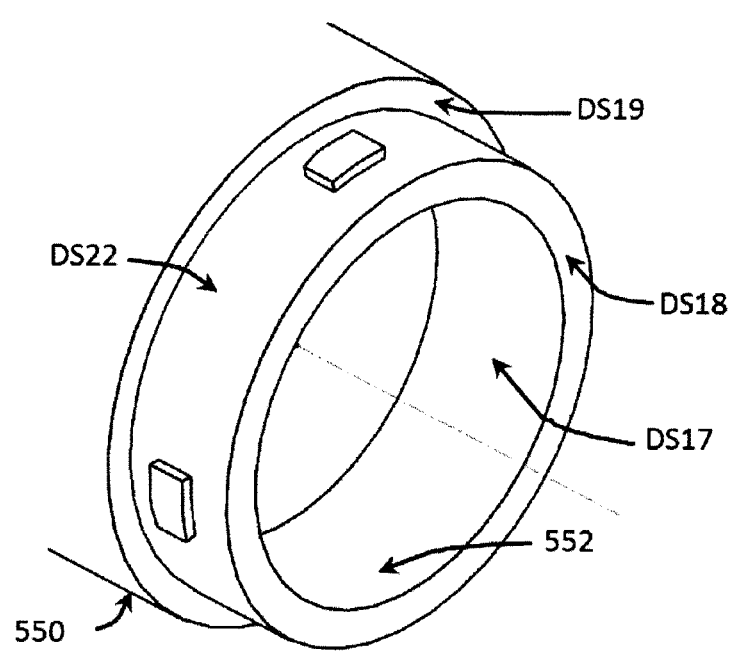
Figure 5T:
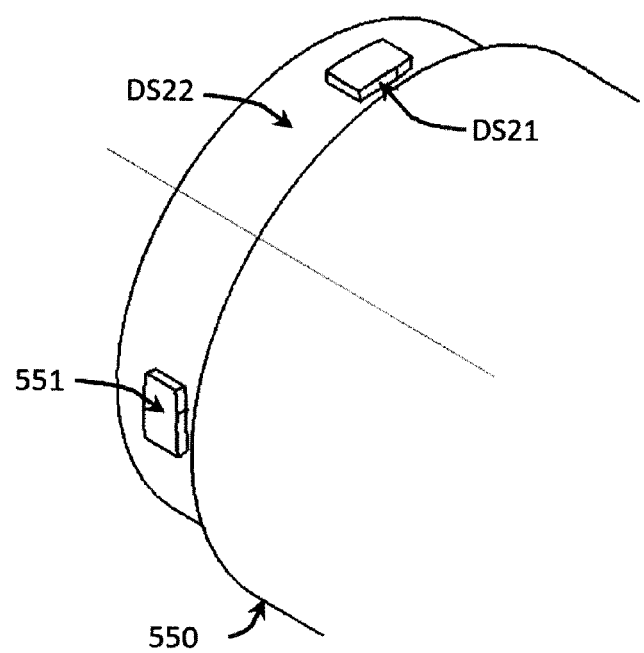

FIGS. 5M & N illustrate side and cross section views of the AJD assembled, including a seal 523.

Figure 5U:
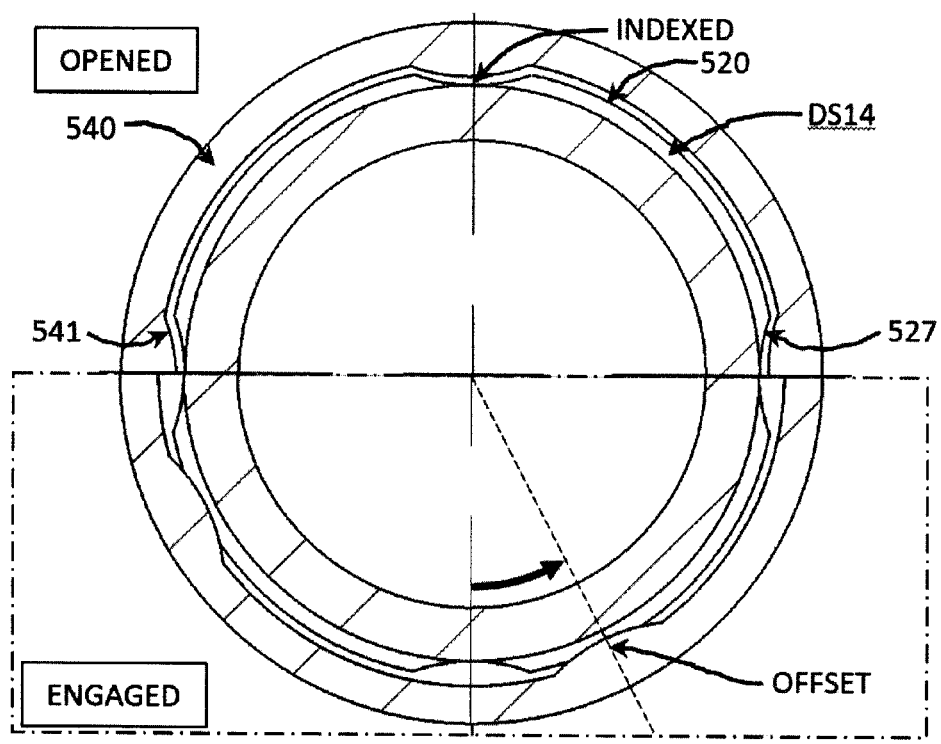

FIG. 5O illustrates the module case 520 aft end design variation which has a scalloped circumferential retaining step 526 and O-Ring seal slot 524. The scallops 527 in the step allow installation of a connecting collar 540 (elsewhere designated 521) (FIGS. 5Q & R) directly onto the module aft end. (One advantage of this design is that a separate internal joint coupling piece 501 (FIG. 5A) is not needed to hold the joint retaining connecting collar 521 (similar to 102) onto the module). The connecting collar 521 is installed onto the module case 520 by aligning the collar ID tabs 541 with the module case retaining ring scallops 527 (FIG. 5U "OPENED"). The module case step 526 holds the connecting collar in place when the collar front end retaining tabs 541 are indexed away from the module case circumferential step scallops 527 (FIG. 5U "ENGAGED"). The connecting collar 540 aft end features grooves 542 (FIGS. 5Q & R) which receive and fasten onto retaining tabs 551 located on the front end of the mating structure; illustrated in FIGS. 5S & T.

During joint final assembly, the connecting collar is rotated completely over the mating structure retaining tabs 551. Both the mating structure retaining tabs and the connecting collar Retaining Tab Engagement/Tightening Grooves 542 may have beveled mating edges. As the coupling ring is turned, the relative movement of the mating beveled surfaces may cause the module and mounting elements to be pulled and held together. The connecting collar 521 (aka 540) and mated pieces are designed to prevent connecting collar reverse rotation under operation loads once the joint is tightened. This may be accomplished through use of rigid or pliable anti-rotation features (not shown) in the connecting collar that prevent relative movement of the mounting fixture 550 retainer tabs 551 in the final seated joint position relative to the connecting collar 540 grooves 542. (Another advantage of this design is that, once assembled, the joint does not rely on friction as the means to resist joint separation forces. As long as the connecting collar remains in the closed position relative to the scallops 527 and mating structure tabs 551, the joint will not separate.

Accidental joint separation during operation would require two separate actions: 1) counter rotation of the connecting collar due to unrealistically excessive operationally induced torsional loads sufficient to overcome the yield strength of the rigid or pliable anti-rotation features material, and 2) longitudinal forces exceeding the friction forces of the overlapping case-to-mount surfaces.)

Figure 5V:
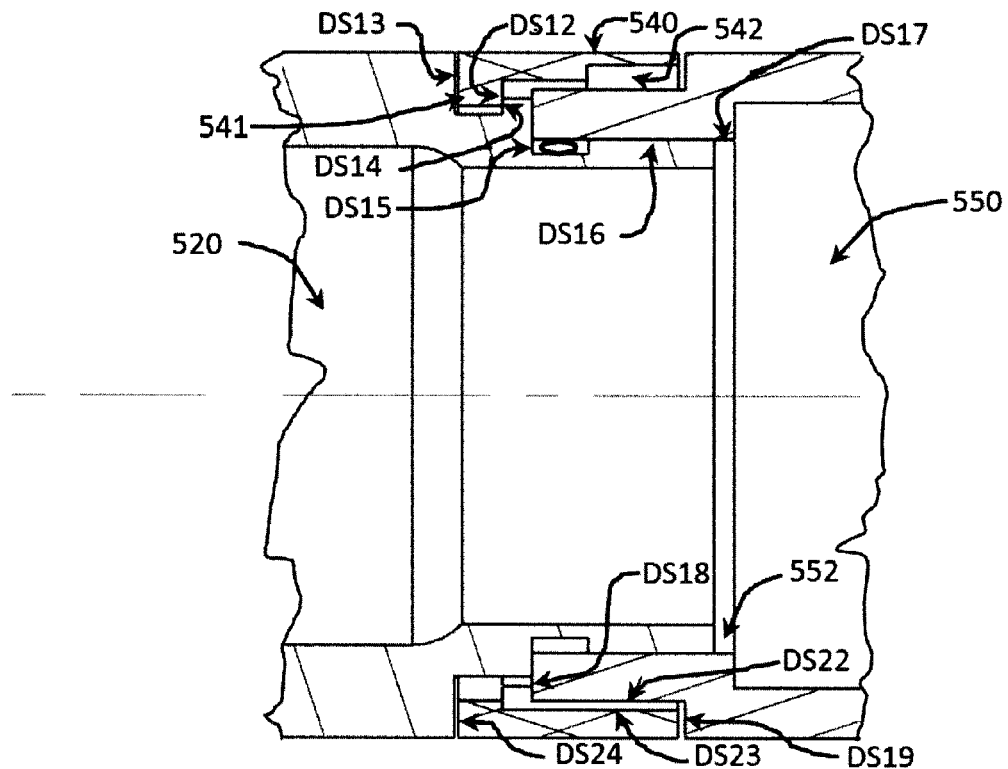

FIG. 5V: The overlapping ends of the module case surface 525 (elsewhere designated DS16) and mating structure surface 552 (elsewhere designated DS17) are designed with a close fit to ensure the module and mating structure centerlines are coincident and the joint will withstand cross-joint bending moments and torsion loading. These surfaces may include anti-rotation features such as tongue & groove, dovetail, gear joint, pliable friction elements, etc. The surface 525-to-surface 552 anti-rotation feature ensures proper relative orientation of the mated pieces and prevents case torsional loads from being transmitted to internal subcomponents. The distances between DS13, DS14 and DS24 are set to provide close non-interference fit between the coupling ring to ensure the joint between the module case 520 at DS15 and the mounting feature 550 at DS18 is tight and that the coupling ring 540 anti-rotation features are fully engaged. The distances between DS23, DS22 and DS19 are set to provide close non-interference fit between the coupling ring 540 and the mounting feature 550.

The module housing shape may take any of a variety of forms, including but not limited to tubular, as needed to accommodate the subcomponents used in the various combinations cited, the module connection and mounting requirements, and the variable module applications. The housing system may or may not include potting.

Image capturing device functions by capturing and focusing EMR, such as visible light, through a lens 104 onto an image sensor (IS) 202. The IS detects and conveys variations in EMR (emitted, passed through, or reflected from objects within the image FOV (Field of View) as shown in FIG. 5A Item 205) that impinge upon the sensor. The sensor converts the impinging EMR into electrical signals which convey the information in the EMR. The types of IS that could be used in this module include but is not limited to semiconductor charge-coupled devices (CCD), active pixel sensors in complementary metal-oxide-semiconductor (CMOS), N-type metal-oxide-semiconductor (NMOS), quantum well infrared photodetector (QWIP), charge-injection device (CID), and cadmium telluride (CdTe) or cadmium zinc telluride (CdZnTe) X-ray detectors, among others. In this embodiment, the IS is a high performance CMOS image sensor.

The IS output is conveyed to and processed by an image processing unit (IPU) who's functions may include providing timing, establish pixel color and intensity, reduce noise, and image correction and sharpening.

The IPU output is conveyed via a parallel or serial format for use by other electronic components such as memory, CPUs, and FPGAs (Field Programmable Gate Arrays) for further processing which may include conversion to USB format.

As shown in FIG. 9, the sensor system 900 may contain one or multiple subcomponent assemblies that provide one or more module functionality. These may include but are not limited to sensors (e.g. radio, microwave, infrared, visible, ultraviolet, X-ray, gamma-ray, etc.), pressure/temperature/humidity sensors, Radioactivity sensors, Sound sensors, Vibration and movement sensors, hazardous substance sensors, wind sensors, module volume contamination sensors, etc. They may also include VPUs, digital memory, characterization/computer vision library/personnel/material/topographical/navigational/GIS (Geographic Information System)/etc. databases.

A sensor system 900 presently disclosed may comprise a sensor hub 910, one or more processing units (CPUs) 934, a memory 932 (which may comprise one or more computer readable storage mediums) as shown in FIG. 9. These components may communicate over one or more communication buses or signal lines 970.

The memory 932 may comprise high-speed random access memory and/or non-volatile memory, such as one or more magnetic disk storage devices, flash memory devices, or other non-volatile solid-state memory devices. The memory 932 may be configured to store one or more operating systems. The operating system comprises various software components and/or drivers for controlling and managing general system tasks (e.g., memory management, storage device control, power management, etc.) and facilitates communication between various hardware and software components of the sensor system 900.

The sensor system 900 presently disclosed may further comprise a radio frequency (RF) circuitry 941. The RF circuitry 941 may be configured to receive and transmit RF signals, also called electromagnetic signals. The RF circuitry 941 converts electrical signals to/from electromagnetic signals and communicates with communications networks and other communications devices via the electromagnetic signals. The RF circuitry 941 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 941 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document. The memory 932 may comprise various software components for handling data received by the RF circuitry 941.

The sensor system 900 presently disclosed may also comprise one or more input/output (I/O) ports 942. The I/O ports 942 are configured to couple one or more external devices to the sensor system 900. The memory 932 may be configured to store a communication module to facilitate communication between the sensor system 900 and other devices over the one or more external ports 942. The I/O port 942 (e.g., Universal Serial Bus (USB), FIREWIRE, etc.) may be configured for coupling directly to other devices or indirectly over a network (e.g., the Internet, wireless LAN, etc.). The I/O port 942 may be used to couple one or more temperature sensors, a laser, a camera, a movement switch, and/or flashlight to the sensor system 900. The memory 932 may comprise various software components for handling data received and/or transmitted by the I/O port 942.

The CPU 934 may be able to check for the assigned identification (ID) code of any accessory connected via the I/O port 942 to the sensor system 900. The assigned ID code may be used to determine the overall dimension of the system. The ID code may be used to check for authorized accessories and configure the I/O port 932 to reject unauthorized accessories. The memory 932 may be configured to store one or more ID codes of the authorized accessories. The CPU 934 may compare the ID code of the accessory connected via the I/O port 932 to the one or more ID codes stored in the memory 932 to determine if the accessory is authorized to be connected with the sensor system 900.

The Electromagnetic Radiation (e.g. visible light camera) sensor 911 and the Vision Processing Unit (VPU) 933, alone and/or in combination with the Neural Network 935 and the CPU 934, may be able to check a visual image of an object and compare it to an on-board and/or remote object identification and characterization database to estimate the identity of objects. This may allow the device to identify and notify a police or military officer, for example, of the presence of malignant and/or benign humans or objects in real world encounters. The object identification may be used to check for authorizations/certifications held by or attributed to the object and inform the officer of the status and help the officer make decisions about how to proceed with handling the object. For example, allowing or baring entry into a secured space.

The electronic inputs from the unique combination of various diverse sensors in the sensor hub 910 processed by the VPU 933, Neural Network 935, and/or CPU 934, along with on-board and/or remote databases and Artificial Intelligence (AI) algorithms may be able to perform high level Artificial Intelligence (AI) operations that enable the user to more proficiently detect and assess conditions and circumstances so as to make better decisions and take more effective actions to optimize their engagements. For example, the user may be able to use the device to detect the identity and condition of a military or police officer injured in battle. The user may be able to use the device to review, select, and implement the most beneficial response to the officer's injuries. In another example, the device may be used to detect and approximate the type and proximity of an attack and the expected extent of injuries from the attack upon a military or police officer wounded in action as they carried or wore the device. In another example the device may be used to monitor and assess the activities and possible impacts and injuries experienced by an athlete while participating in their sport. The data may be analyzed and communicated via wireless network real-time and/or in after-action reviews. The outputs of the device might be used to monitor and evaluate the athlete's performance and improvement as they occur. All the data generated may be stored on-board or remotely for future reference in courts of law, in the case of police officers, or in coaching sessions with athletes.

The availability of electronic inputs from the customizable combination of various diverse sensors in the sensor hub 910 that may be processed by the VPU 933, Neural Network 935, and/or CPU 934, along with on-board and/or remote databases and Artificial Intelligence (AI) algorithms housed in an extreme environment-tolerant encasement may provide a means of inspiring, developing, and employing completely new unique innovative approaches, strategies, and techniques of accomplishing both known and currently unknown objectives.

The encasement 100 for the device may have specially designed features that permit the reception and transmission of input and output stimulus through the walls of the encasement such that the internal contents of the device remain sealed off from the environment including pressurized and/or vacuum environments. For example, the encasement thickness may be minimized and made of a flexible material near the microphone to permit accurate sensing of acoustic (sound) waves through the encasement into the microphone, and/or to permit accurate measurement of pressure/vacuum. The encasement of the device may be made of multiple separate parts that may be threaded or otherwise sealed and fastened together. Subassemblies of the sensor system may be installed in separate sub-encasements that are electrically connected during assembly via mechanical conductor or RF connections.

The encasement 100 may comprise a push button to turn on/off the sensor system 900. The push button may be used to connect the RF circuitry 941 of the sensor system 900 to an external device(s). The push button may be sealed against particles and/or fluids entering the encasement 100.

Referring to FIG. 1, the body 100 may further comprise a screw thread or quick release feature to allow attachment of an accessory to the body 100. The body 100 may comprise a rubber O-ring to create fluid proof seal between the body 100 and the accessory.

The sensor hub 910 may have multiple instances of each type of sensor. This may provide the ability to have multiple sources of the same type, range, and sensitivity of sensing to provide redundancy for reliability and/or fault tolerance in critical applications. It may also permit spatial detection as in 3D depth and location perception using, for example, multiple identical image sensors, or multiple identical acoustic sensors. This may also provide the ability to have sensors of the same type but with different operating ranges and/or sensitivities which may allow broader overall range of detection and higher fidelity detection due to each instance of sensor having a narrower range and higher sensitivity and/or performance within that range. For example, the sensor hub 910 might include a visible light sensor, an ultraviolet light sensor, and/or an infrared light sensor with different sensitivities and performance characteristics. Having multiple varied wavelength range image sensors may allow for optimal imaging in normal and/or low light, and/or night conditions. Having multiple different acoustic sensors may provide for detection of audible as well as inaudible sounds in different medium such as solids, air and/or water.

The sensor system 900 presently disclosed may comprise a power system 950 for powering the various components of the sensor system 900. The power system 950 may comprise a power management system, one or more power sources, e.g., battery, alternating current (AC), a recharging system, a power failure detection circuit, a power converter or inverter, a power status indicator, e.g., a light-emitting diode (LED) and/or any other components associated with the generation, management and distribution of power in portable devices. The I/O port 932 may be configured to deliver power to the power system 950. The I/O port 932 may be configured to deliver power from the power system 950 to at least one external device. The I/O port 932 may be configured to deliver power from the power system 950 to a camera for visual recording of shots, a flashlight, a laser, a temperature sensor, etc. The I/O port 932 may be used to re-program the power system 950 with different power algorithms to accommodate power requirement of different accessories.

The sensor hub 910 may comprise one or more electro-magnet radiation sensors (including image sensing) 911, image distance sensors 912, accelerometers 913, gyroscopes 914, magnetometers 915, global position system (GPS) elements 916, acoustic (e.g. audio) elements 917, barometer/pressure sensors 918, and/or other elements 919.

The acoustic (e.g. audio) element 917 may comprise a microphone to receive acoustic (sound) waves generated by the tool or environment and to convert the acoustic (sound) waves to electrical signals (i.e. acoustic signal). The acoustic (e.g. audio) element 917 may convert the electrical signal to audio data and transmits the audio data to CPU 934 for processing. The audio data may be retrieved from and/or stored to the memory 932. The sensor system 900 may determine various diverse functions and malfunctions of the tool by the sound waves received by the microphone.

The acoustic (e.g. audio) element 917 may comprise a vibrating element (e.g. speaker) to transmit acoustic (sound) waves to the tool, user, or environment by converting acoustic data from the CPU 934 to electrical signals (i.e. acoustic signals) then converting electrical signals into physical vibrations. The audio data may be retrieved from and/or stored to the memory 932. The acoustic (sound) waves transmitted to the tool, user, or environment may consist of audible and/or inaudible messages and/or commands detectable by the intended receiver.

The microphone may receive voice and/or other acoustic signals and/or commands generated by the user of the tool and the audio circuitry 917 converts the voice commands to electrical signals (i.e. acoustic signal). The acoustic circuitry 917 may convert the electrical signal to audio data and transmit the audio data to the CPU 934 for processing. The audio data may be retrieved from and/or stored to the memory 932.

The sensor system 900 may be able to determine tool's (e.g. nail gun) operational actions such as, for example, the slide of the nail retaining spring being opened and latched, the refill nail set of the nail gun being inserted. The sensor system 900 may be able to determine tool's operational action using sound waves collected by the microphone. The sensor system 900 may be able to determine tool's operational action using sound waves collected by the microphone in combination with movements sensed by the accelerometer 913 and/or the gyroscope 914 and/or the magnetometer 915.

The gyroscope 914 may be configured to measure angular rotational velocity of the sensor system 900. The gyroscope 914 may be a 3-axis gyroscope. The gyroscope 914 may be used to measure how much the nail gun twists upon the firing of a nail. This information can be used by nail gun designers to optimize nail gun operational characteristics by minimizing twist.

The magnetometer 914 may measure direction the tool is pointed. The magnetometer allows the sensor system 900 to determine the tool's orientation. This data is useful for positional algorithms. The magnetometer 914 may be a 3-axis magnetometer.

The sensor system 900 may comprise a time clock 931 to determine and record time. The CPU 934 may be able to log, timestamp and analyze the information collected from one, multiple, or all the various sensors in the sensor hub 910. The CPU 934 may be able to run one or more algorithms to convert time stamped measurements obtained from the sensor hub 910 into time stamped vectors or events that can be provided to other devices.

The CPU 934 may perform a proprietary sensor fusion algorithm on the data collected by the motion and orientation sensing elements in the sensor hub 910 to generate quaternions, Euler angles, rotation/matrices and/or similar systems that describe object physical status in 3D. The sensor fusion algorithms may use N-axis data from the single or multiple instantiations of multi-axis sensors such as accelerometer 913, gyroscope 914, magnetometer 914 image sensor, GPS, etcetera.

The sensor system 900 may be able to run 6, 9, 12, and N-axis sensor fusion to compute rotational and game rotational vectors that may be used for virtual and augmented reality motion control. The sensor system 900 may be programmed with different fusion algorithms for different data analysis.

The data measured and/or generated by the sensor hub 910 may be stored in the memory 932. The data measured and/or generated by the sensor hub 910 may be transmitted to another device using the RF circuitry 941 and/or the I/O Port 942. The data measured and/or generated by the sensor hub 910 may be transmitted to a smart phone, tablet, or a computing device using the RF circuitry 941 and/or the I/O Port 942.

The CPU 934 may comprise one or more Application Program Interface (API) extensions to allow third party developers access to the data collected by the sensor system 900 to create games and/or training applications. The API extensions may allow third party users to develop applications that can run on Android, IOS, and/or other operating system-based phones, tablets, and set top boxes.

The sensor system 900 may work as a standard Human Interface Device (HID) such as a wireless air brush for regular applications. The wireless air brush mode may be a default mode when the sensor system 900 connects to cellphones/tablets/computer unless set to a different default mode in software.

The HID interface may be switched to the rotation vector or game rotation vector mode via the API to fit the virtual reality or augmented reality applications that may need and/or support it. These vectors may be derived using the CPU 934 or may be derived using an external CPU. The custom rotation vector algorithms may accommodate extremely high sampling rates and/or incorporate the data from other sensor hub 910 elements for N-axis operation for high speed, high shock movements.

The sensor system 900 may be accessed by an app running on a smartphone, tablet and/or computing device for real time analysis and/or aggregated multi-operation analysis. The sensor system 900 may be accessed through the RF circuitry 941 and/or the I/O Port 942. The CPU 934 may provide simple shot by shot feedback via color of a multi-colored LED 921. Users may be able to analyze single operation cycles as well as multiple rapid operation cycles using the LED 921 and/or the app running on a computing device.

Different colors of the multicolored LED 921 may also be used to show successful RF circuitry pairing, power status, good, and/or bad tool operation, successful connector engagement, and attachment activation/operation.

The electromagnet emitter hub 920 may include various forms of emitters that can be used to illuminate environment objects (e.g. flashlight LED), measure distances (e.g. laser range finder), and/or be used for visible and/or invisible light communications.

Referring to FIG. 1C, the body 100 may comprise an opening 117 to allow access to the I/O port 109 and to allow power and/or data to be transmitted between the sensor system 900 and the accessory. The body 100 may be about 3″ to 5″ in length and about 1″ in diameter.

The sensor system 900 as shown in FIG. 9 may comprise more or fewer components than shown, may combine two or more components, or a may have a different configuration or arrangement of the components. The various components shown in FIG. 9 may be implemented in hardware, software or a combination of both hardware and software, including one or more signal processing and/or application specific integrated circuits. Components of the sensor system 900 may be implemented on a single chip. Components of the sensor system 900 may be implemented on separate chips.

Figures 12H, 12I, 12J, 12K, 12L:
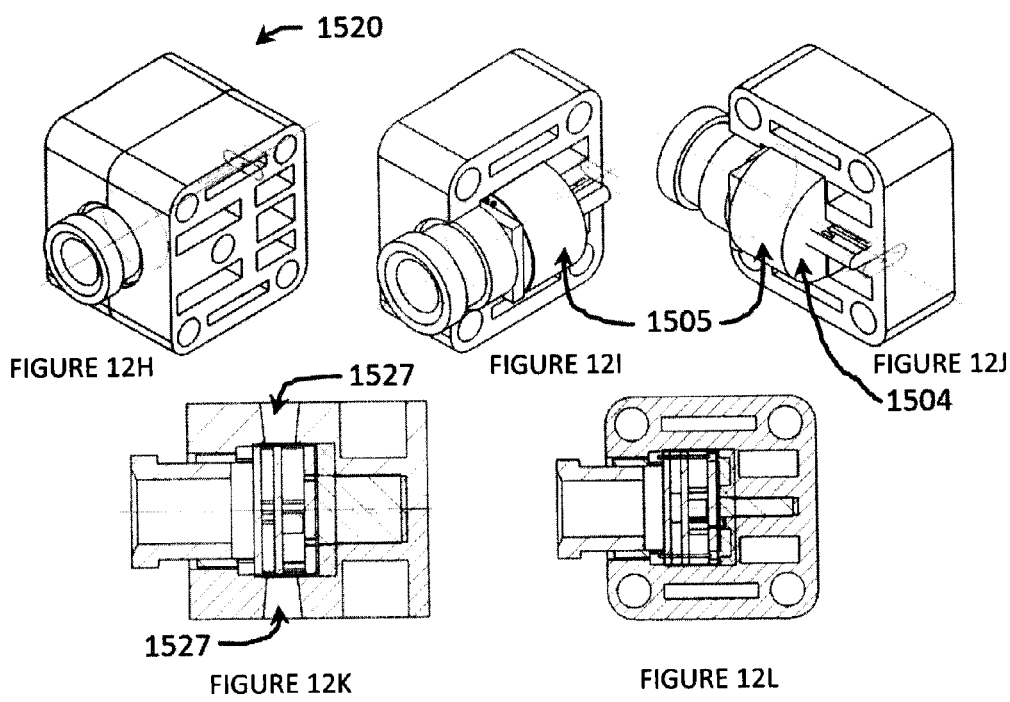
FIGS. 12H-L Illustrate an Encapsulated Subcomponent in an Encapsulation and Curing Mold.

Various materials may be used inside the encasement to provide subcomponents with: structural and positioning support; impact and vibration protection; thermal protection; and contamination protection. This use of materials to encapsulate electronics is similar to their use as described in U.S. Pat. No. 7,357,886 B2 issued to Lauren A. Groth on Apr. 15, 2008, entitled "Singular Molded and Co-Molded Electronic's Packaging Pre-Forms". The U.S. Pat. No. 7,357,886 B2 is incorporated by reference herein in its entirety. Example materials include DOWSIL™3-6655 Thermally Conductive Encapsulant and DOWSIL™3-6751 Thermally Conductive Adhesive. In this embodiment, these materials may be employed in a variety of combinations including pre-molded and cured as separate parts for installation into the encasement (FIGS. 11A-G), poured and cured within a subassembly of separate parts for subsequent installation into the encasement (FIGS. 12A-R), and/or poured into and cured inside the encasement (In-situ) to encapsulate the subcomponents. The separate pre-molded parts 1405 may be, but are not limited to being, used: to align subcomponents during assembly into the case; as molding barriers and seals for controlling the volume subjected to uncured Encapsulate/Adhesive (E/A) material poured into the case for subsequent curing; as wear resistant features at exposed encapsulation surfaces prone to wear and tear; and as wear resistant covering for subcomponents encapsulated and cured prior to installation into the encasement. The volumes between adjacent subcomponents and PCBs may be occupied by pre-molded E/A parts 1405 (FIGS. 12A-R), pre-formed and cured E/A potting (FIGS. 12A-R) or with liquid E/A, the latter of which is subsequently cured inside the encasement. The improvements over U.S. Pat. No. 7,357,866 B2 include: Using pre-molded parts to: a) properly locate subcomponents inside a space during sub-assembly and/or final assembly process, b) act as molding and sealing elements to control the shape and flow of un-cured liquid E/A poured into a space, c) combining the use of pre-cured and un-cured material in a single application, d) precision tuning the encasement system performance by combining pre-formed parts made from a variety of E/A materials with parts made of various E/A materials formed as separate pre-molded parts or formed and cured in the encasement, e) installation of cured E/A parts between adjacent PCBs during subcomponent/PCB assembly (FIGS. 13D-F) to absorb heat and shock and vibration from between adjacent PCBs and/or to control relative position of adjacent PCBs/subcomponents during assembly and/or operation of electronics, f) breaching and repairing E/A encasements previously cured on electronic components during previous manufacturing steps (FIGS. 13A-E) to remove existing or install additional subcomponents and/or test installed subcomponents before and after the curing process (FIGS. 13A-E), and g) device cases can be designed and pretreated to allow monolithic or hybrid (i.e. combining uncured and one or more preformed pre-cured E/A part) in-situ molding of form-fitting removable electronics encasements that maximize heat transfer and shock and vibration absorption by providing up to 100% contact with adjacent case surfaces. Other materials may be used inside the encasement to provide subcomponents with electromagnetic interference (EMI) protection.

FIGS. 11A-G Illustrate a Pre-Form Part Manufacturing Process using molds 1400 & 1410 to pre-form, set, and/or cure E/A parts. The E/A material is poured into the mold void 1401 and excess material is scrapped off the top mold surface, leaving only material needed for the final part 1405 plus tab features 1404, 1412 & 1414 that aid removal of the set and/or cured part from the mold. Raised features 1402 in the molds create voids 1407 in the part where needed and recesses in the molds 1403 create protrusions 1406. Chamfers and/or radii in the mold 1411 may be used to form sharp or rounded molded part edges 1413 to aid sealing molded part-to-case interfaces.

FIGS. 12A-R Illustrate a Pre-Cured Subcomponent Encasulation Manufacturing Process using 3D molds 1520 and/or wrapping 1540 that surround the component or assembly to be encapsulated by E/A. In this process, voids 1500 within or between sub-components or sub-assemblies may be filled in a controlled manner with E/A or other material 1501. Molds may be designed and used to fill different voids 1500 with different materials 1501, with and without post-fill curing, at different steps in the manufacturing process.

FIGS. 12E-L Illustrate a 3D multi-piece mold 1521 & 1522 designed to extrude E/A into voids 1500 between and around three PCBs such as 203, 204 & 206 and associated electronic components such as 109, 401, 407 & 224. In this example, the mold creates a void around the entire PCBs' ODs 1503 thereby producing a continuous E/A encasement 1505 around the PCB stack and associated components. The mold may have assembly positioning features 1523, 1525 & 1526 which precisely suspend and index the assembly in the mold to create precise encasements 1505 & 1504 which may be used to locate the encased assembly inside other assemblies or encasements with precision, thereby ensuring proper alignments during assembly installation and use. The mold may have injection/vent holes 1527, diffusers/collectors 1528, and component-accommodating-recesses 1524 to facilitate E/A extrusion and to ensure full distribution of E/A throughout the mold voids. The mold may have fluid channels 1529 that allow even curing of the E/A in the mold. The mold may also have alignment features 1530 to ensure proper positioning of the various mold pieces.

FIGS. 12M-R Illustrate a method of filling voids with E/A between PCBs by partially wrapping the PCB ODs 1541 with tape or foil 1540, filling the voids with E/A 1543, agitating the E/A with a probe 1542 as needed to eliminate entrained voids in the E/A, followed by closing the tape or foil for E/A curing. The resulting assembly, with pre-cured E/A, may be included in higher level assemblies which may include additional applications of uncured and/or cured E/A. It is important to note that the tape and/or foil may remain on the assembly after curing for a variety of reasons such as to protect the cured E/A and/or to serve unrelated purposes, for example, as an EMI (Electromagnetic Interference) shield.

FIGS. 13A-E Illustrate a Potted Subcomponent Access and Potting Restoration Process. One use for this process is to access PCBs or components after they have been encased in E/A. This may be necessary to attach wires onto solder pads/holes and/or to remove and replace components within the potted assembly. The process may be performed on a previously potted assembly 1550 (for example potting 1501 between two PCBs 1551), and involves removing existing potting 1552 from the area of interest 1553, removing and/or replacing components 1554, and then restoring the potting in the affected volume 1555.

FIGS. 14A-D Illustrate a Combined Pre-Filled and In-Situ Encasement Molding Process. One use for this process is to produce an assembly, that has one or more component or subassembly encased in one or more type of previously applied E/A 1501, subsequently further encased in one or more type of E/A 1504 & 1505. The resultant combined encasement 1506 may (or may not) be intended to fill the void between the assembly and the device outer case after assembly inside the case, i.e. In-Situ. One embodiment of the combined encasement 1506 might be comprised of material intended to encase the surface and components of a PCB 1504, and/or the outer diameters of stacked PCBs 1505.

FIGS. 15A-E Illustrate a Combined Pre-Formed and In-Situ Encasement Molding Process. One use for this process is to produce an assembly, that has one or more component or subassembly encased in one or more type of previously applied E/A 1501, followed by addition of one or more type of pre-formed E/A part 1601, which together are subsequently encased 1603 to create a hybrid encasement 1600. The resultant combined encasement 1600 may (or may not) be intended to fill the void between the assembly and the device outer case after assembly inside the case, i.e., In-Situ. One embodiment of the combined encasement 1600 might be comprised of a pre-formed and cured part 1601 intended to both position and encase the surface and components of a PCB 204. Note that the voids 1602 between the pre-formed part 1601 and the subcomponents may be filled during application of the subsequent encasement material 1603.

FIGS. 16A-C Illustrate a Combined Pre-Cured and Pre-Formed Subcomponent Potting Process. One use for this process is to install pre-cured pre-formed E/A parts 1701 into subassemblies while the subassemblies are being fabricated. Pre-cured Pre-formed parts 1701 are pre-molded with protrusions 1702, holes/channels 1703, and/or recesses 1704 as needed to place the part into the subassembly, precisely position the part and adjacent sub-components, encase adjacent sub-components, allow components and features to pass through the part, and allow fastening adjacent parts/components about the part as needed to build the subassembly.

In FIG. 15A, it will be appreciated that STEP 1 & 1A can follow STEP 3 whereby the pre-molded piece is mated, for example, to the back of the subcomponent assembly after inserting the assembly into the encasement. This process may encapsulate and cure subcomponents/assemblies with potting material. The process may be done as an interim step in the assembly of a larger assembly—which may also be previously and/or subsequently potted.

This specification is to be construed as illustrative only and is for the purpose of teaching those skilled in the art the manner of carrying out the disclosure. It is to be understood that the forms of the disclosure herein shown and described are to be taken as the presently preferred embodiments. As already stated, various changes may be made in the shape, size and arrangement of components or adjustments made in the steps of the method without departing from the scope of this disclosure. For example, equivalent elements may be substituted for those illustrated and described herein and certain features of the disclosure may be utilized independently of the use of other features, all as would be apparent to one skilled in the art after having the benefit of this description of the disclosure.

While specific embodiments have been illustrated and described, numerous modifications are possible without departing from the spirit of the disclosure.

It will be appreciated that the components of this disclosure may be made using a wide variety of materials and processes. It will also be appreciated that parts may be held in place during and after assembly and during use by various means including: Loctite, stake, locking screw, glue, swage, pliable inserts, etc.

What I claim is:

1. A cylindrical housing having a first end adapted to contain a camera, tracker, motion detector or electronic component within a sealable aperture of the first end comprising:
    (a) a window retaining collar, having a cylindrical inside diameter, removably attachable to an exterior of a first end of a cylindrical housing case for holding a removeable or interchangeable electromagnetic radiation transparent or translucent aperture window positioned entirely exterior to said cylindrical housing case, said aperture window recessed entirely within said window retaining collar;
    (b) a dedicated seal carriage carrying first and second O-rings for sealing an inner surface of said aperture window and sealing an inner surface of the cylindrical housing case, respectively;
    (c) the first O-ring positioned to seal said inner surface of said aperture window to a forward-facing concentric slot of said seal carriage, said forward-facing concentric slot positioning said first O-ring at least partially external to a forwardmost edge of the first end of the cylindrical housing case; and
    (d) the second O-ring positioned to seal a side-facing concentric slot of the seal carriage and said inner surface of the cylindrical housing case,
    wherein said seal carriage solely provides said exterior positioning and sealing of said window via said first O-ring in said forward-facing concentric slot, and said sealing between said inner surface of the window and said inner surface of the cylindrical housing case via said second O-ring in said side-facing concentric slot.

2. The cylindrical housing of claim 1 wherein the window retaining collar is threaded onto a complementary threaded exterior surface of the cylindrical housing case.

3. The cylindrical housing of claim 1 wherein the window retaining collar and the cylindrical housing case comprise complementary quick release components, wherein said window retaining collar comprises interior and/or exterior formed features which receive and fasten with exterior and/or interior formed features at the first end of the cylindrical housing case, wherein full assembly or disassembly of the window retaining collar and the cylindrical housing case is too-free and requires less than 360 degrees of relative rotation about a longitudinal axis of the cylindrical housing case.

4. The cylindrical housing of claim 1 further comprising a gasket positioned to cushion and seal an outer surface and edge of said electromagnetic radiation transparent or translucent aperture window to the window retaining collar.

5. The cylindrical housing of claim 1, wherein the seal carriage comprises a radially-extending portion positioned between an outer edge of an inner surface of the window and the forwardmost edge of the first end of the housing.

6. The cylindrical housing of claim 1, further comprising a tracking/image capturing device extending along a longitudinal axis of the cylindrical housing and comprising one or more electronic components encapsulated with and no-rigidly suspended by a flexible and thermally conductive and/or vibration dampening potting/encapsulant configured to provide impact, explosion, vibration, thermal, contamination protection, and positioning for said one or more electronic components.

7. The cylindrical housing of claim 6, further comprising:
an aft end electromechanical coupling connector electrically coupled to the one or more electronics and positioned within a second end of the cylindrical sealable housing; and
an end part comprised of said thermally conductive and/or vibration dampening potting/encapsulant and positioned at an aft end of the tracking/image capturing device;
wherein the end part and the potting/encapsulant encapsulating the one or more electronic components provides sole structural and positioning support for the tracking/image capturing device within the cylindrical sealable housing, wherein the end part is configured to contact an exterior mount to which the cylindrical housing is mounted such that heat and/or vibration are dissipated from the potting/encapsulant encapsulating the one or more electronic components and the end part through material of the exterior mount.

8. The cylindrical housing of claim 7, further comprising an air pocket positioned directly between the removable window and the encapsulated components of the tracking/image capturing device, wherein the thermal conductivity of the potting/encapsulant heats air in the air pocket in contact with the inner surface of the aperture window so as to directly defog or de-ice, via the heated air, an inner or outer surface of the removable window during operation of the one or more electronic components.

9. The cylindrical housing of claim 7, wherein said aft end electromechanical coupling connector comprises a joint coupling connected to said cylindrical housing case providing rigid alignment of the cylindrical housing case with the exterior mount to ensure alignment of the one or more electronics with one or more electrical connectors of the mount, and to maintain longitudinal and rotational alignment with the mount.

10. The cylindrical housing of claim 9, wherein the joint coupling of the aft end electromechanical coupling connector rigidly aligns the cylindrical housing case holding the tracking/image capturing device and a potting/encapsulant suspended electrical connector flexibly aligns the one or more electronic components with a datum axis to ensure alignment of this tracking/image capturing device datum axis with one or more datum axes of the mount to which the tracking/image capturing device is connected.

11. The cylindrical housing of claim 7, wherein the housing additionally comprises a power and data input-output electrical connector positioned on or in an outer wall of the housing, and non-rigidly electrically connected to one or more components within said cylindrical housing case so as to isolate cylindrical housing case impact and vibration from said one or more components.

12. The cylindrical housing of claim 11, wherein the outer wall-mounted power and data input-output electrical connector utilizes leakproof, explosion proof (cannot cause an explosion), explosion tolerant (operable when exposed to an explosion), electronic and magnetic components to hold and connect external power and data transmission components to the housing and the one or more electronic components, respectively; and where the aft end electromechanical coupling connector utilizes leakproof, explosion proof, explosion tolerant, components.

13. The cylindrical housing of claim 11, wherein the outer wall-mounted power and data input-output connector provides a seal against positive pressure and vacuum, and the aft end electromechanical coupling connector provides a reusable seal against pressure and vacuum.

14. The cylindrical housing of claim 11, wherein the outer wall-mounted power and data input-output connector is structured beyond flush with, or recessed within an exterior surface of the housing.

* * * * *